(12) United States Patent
Smith et al.

(10) Patent No.: US 8,402,695 B2
(45) Date of Patent: Mar. 26, 2013

(54) HEATED REAR SLIDER WINDOW ASSEMBLY

(75) Inventors: Dominic C. Smith, Plymouth, MI (US); Troy F. Tooker, Allegan, MI (US); Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 268 days.

(21) Appl. No.: 12/850,864

(22) Filed: Aug. 5, 2010

(65) Prior Publication Data

US 2011/0030276 A1 Feb. 10, 2011

Related U.S. Application Data

(60) Provisional application No. 61/347,920, filed on May 25, 2010, provisional application No. 61/296,174, filed on Jan. 19, 2010, provisional application No. 61/231,854, filed on Aug. 6, 2009.

(51) Int. Cl.
*E06B 1/00* (2006.01)

(52) U.S. Cl. .............................. 49/380; 49/413; 49/332

(58) Field of Classification Search .................... 49/380, 49/413, 327, 331, 332
See application file for complete search history.

(56) References Cited

U.S. PATENT DOCUMENTS

| | | |
|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |

(Continued)

*Primary Examiner* — Jerry Redman

(74) *Attorney, Agent, or Firm* — Gardner, Linn, Burkhart & Flory, LLP

(57) ABSTRACT

A rear slider window assembly includes a frame portion, at least one fixed window panel and at least one movable window panel that is movable along the frame portion. The movable window panel is movable between a closed position and an opened position and has a first electrical element (such as a heater element) established thereat. The first electrical element is electrically connected to a power source of the vehicle irrespective of whether the movable window panel is in the opened or closed position. The first electrical element may be electrically connected to the power source of the vehicle via a flexible connector that is connected at one end to the first electrical element and at another end to an electrical connector at the fixed window panel, such as at an electrical element of the fixed window panel.

21 Claims, 36 Drawing Sheets

U.S. PATENT DOCUMENTS

| | | | |
|---|---|---|---|
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A | 12/1999 | Freimark et al. | |
| 6,014,840 A | 1/2000 | Ray et al. | |
| 6,026,611 A | 2/2000 | Ralston et al. | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 | 12/2001 | Koneval et al. | |
| 6,328,243 B1* | 12/2001 | Yamamoto | 242/378.1 |
| 6,490,832 B1 | 12/2002 | Fischbach et al. | |
| 6,525,659 B2 | 2/2003 | Jaffe et al. | |
| 6,591,552 B1 | 7/2003 | Rasmussen | |
| 6,598,931 B2 | 7/2003 | Tamura | |
| 6,691,464 B2 | 2/2004 | Nestell et al. | |
| 6,742,819 B2 | 6/2004 | So et al. | |
| 6,766,617 B2 | 7/2004 | Purcell | |
| 6,955,009 B2 | 10/2005 | Rasmussen | |
| 7,003,916 B2 | 2/2006 | Nestell et al. | |
| 7,010,883 B2 | 3/2006 | Jaerpsten et al. | |
| 7,073,293 B2 | 7/2006 | Galer | |
| 7,184,190 B2 | 2/2007 | McCabe et al. | |
| 7,186,118 B2 | 3/2007 | Hansen et al. | |
| 7,255,451 B2 | 8/2007 | McCabe et al. | |
| 7,259,359 B2 | 8/2007 | Davey et al. | |
| 7,400,435 B2 | 7/2008 | Byers et al. | |
| 7,608,949 B2 | 10/2009 | Busch | |
| 7,626,749 B2 | 12/2009 | Baur et al. | |
| 7,871,272 B2* | 1/2011 | Firman et al. | 439/34 |
| 7,900,863 B1* | 3/2011 | Cheng | 242/378.1 |
| 8,042,664 B2* | 10/2011 | Rutkowski et al. | 191/12.2 R |
| 2003/0074842 A1 | 4/2003 | Eckhardt et al. | |
| 2003/0140562 A1 | 7/2003 | Staser et al. | |
| 2003/0188490 A1 | 10/2003 | Kraus et al. | |
| 2003/0213179 A1 | 11/2003 | Galer | |
| 2004/0020131 A1 | 2/2004 | Galer et al. | |
| 2004/0065017 A1 | 4/2004 | Priest et al. | |
| 2004/0065018 A1 | 4/2004 | Regnier et al. | |
| 2006/0061008 A1 | 3/2006 | Karner et al. | |
| 2006/0107600 A1 | 5/2006 | Nestell et al. | |
| 2006/0130405 A1 | 6/2006 | Hemond et al. | |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0202032 A1 | 8/2008 | Loidolt | |
| 2009/0322705 A1 | 12/2009 | Halsey, IV | |
| 2010/0146859 A1 | 6/2010 | Gipson et al. | |
| 2010/0154312 A1 | 6/2010 | Gipson et al. | |
| 2010/0182143 A1 | 7/2010 | Lynam | |
| 2010/0240229 A1* | 9/2010 | Firman et al. | 439/34 |
| 2011/0030276 A1 | 2/2011 | Smith et al. | |

* cited by examiner

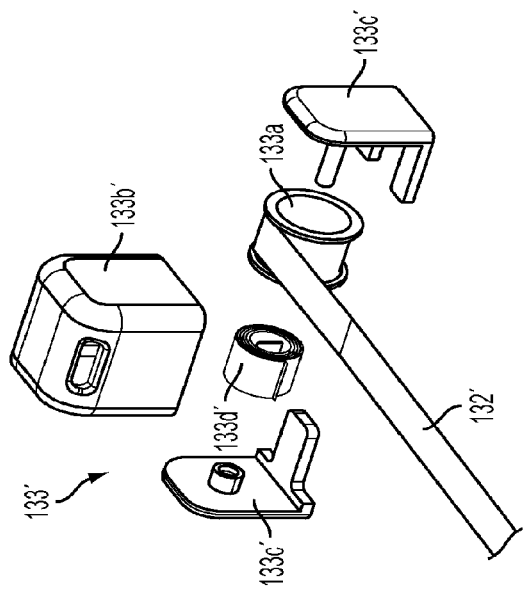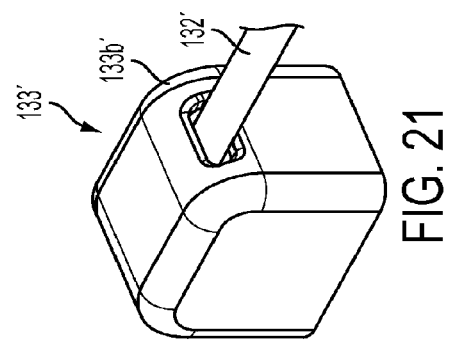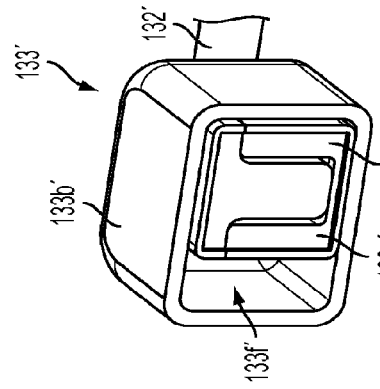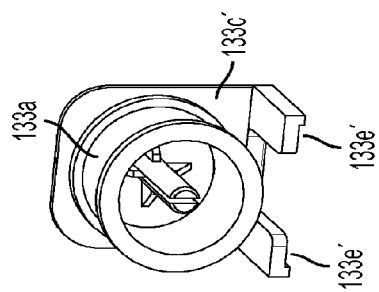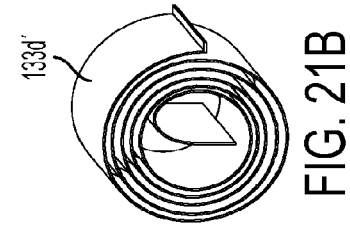

HEATED REAR SLIDER WINDOW ASSEMBLY

CROSS REFERENCE TO RELATED APPLICATIONS

The present application claims the priority benefit of U.S. provisional applications, Ser. No. 61/347,920, filed May 25, 2010, Ser. No. 61/296,174, filed Jan. 19, 2010, and Ser. No. 61/231,854, filed Aug. 6, 2009, which are hereby incorporated herein by reference in their entireties.

FIELD OF THE INVENTION

The present invention relates to a rear slider window assembly for a vehicle and, more particularly, a heated rear slider window assembly for a vehicle, such as a pickup truck or the like.

BACKGROUND OF THE INVENTION

It is known to provide a slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. It is known to provide a heating element at the window assembly to defog or defrost the window panels. The fixed window panels typically include respective heater grids that are electrically connected to a power source and are heated responsive to actuation of a user input. The movable window panel typically includes a heater grid that is electrically connected the power source when the movable window panel is closed, whereby electrical terminals at the movable window panel may be electrically connected to or in electrical contact with electrical terminals at the frame or latch, and whereby the movable window panel is not electrically connected to the power source when the movable window panel is opened or partially opened.

SUMMARY OF THE INVENTION

The present invention provides a rear slider window assembly that provides for defogging or defrosting of the fixed and movable window panels of the rear slider window assembly. The window assembly of the present invention is operable to heat or defog or defrost the movable window panel irrespective of whether the movable window panel is opened or partially opened or closed. The present invention thus provides enhanced capability of heating or defogging or defrosting (or providing electrical power to) the movable window panel (typically the center window panel) and may heat or defog or defrost or provide power to the movable window panel even when the movable window panel is partially opened (as may be desired to increase air flow through the cabin of the vehicle).

According to an aspect of the present invention, a rear slider window assembly of a vehicle (such as a pickup truck or the like) includes a frame portion having an upper rail and a lower rail, at least one fixed window panel that is fixed relative to the frame portion, and at least one movable window panel that is movable along the upper and lower rails. The at least one movable window panel is movable between a closed position and an opened position. The at least one fixed window panel has a first electrical element established thereon and the at least one movable window panel has a second electrical element established thereon. The second electrical element is electrically conductively connected to a power source of the vehicle and is electrically powered irrespective of whether the movable window panel is in the opened or closed positions.

Optionally, the second electrical element is electrically connected to the power source of the vehicle via a flexible connector that is connected at one end to the second electrical element and to another end to an electrical connector. Optionally, the electrical connector is disposed at the fixed window panel and is electrically conductively connected to the first electrical element. The first electrical element may be electrically conductively connected to the vehicle power source via a vehicle wiring harness or the like. The first and second electrical elements may comprise first and second heater grids established on the fixed window panel and the movable window panel, respectively.

These and other objects, advantages, purposes and features of the present invention will become apparent upon review of the following specification in conjunction with the drawings.

BRIEF DESCRIPTION OF THE DRAWINGS

FIG. 21 is a perspective view of the extendable/retractable mechanism of the rear slider window assembly of FIGS. 19 and 20;

FIG. 21A is an exploded perspective view of the extendable/retractable mechanism of FIG. 21;

FIG. 21B is a perspective view of a torsional spring suitable for use in the extendable/retractable mechanism of FIG. 21A;

FIG. 21C is a perspective view of a spool suitable for use in the extendable/retractable mechanism of FIG. 21A;

FIG. 21D is an underside perspective view of the extendable/retractable mechanism of FIG. 21A;

DESCRIPTION OF THE PREFERRED EMBODIMENTS

Figure 1:
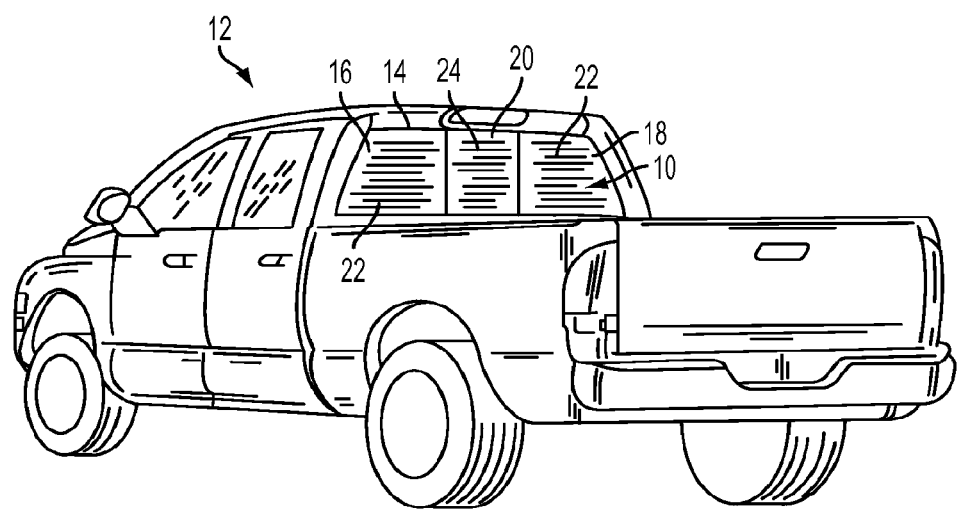
FIG. 1 is a rear perspective view of a pickup truck having a rear slider window assembly in accordance with the present invention.
Figure 2:
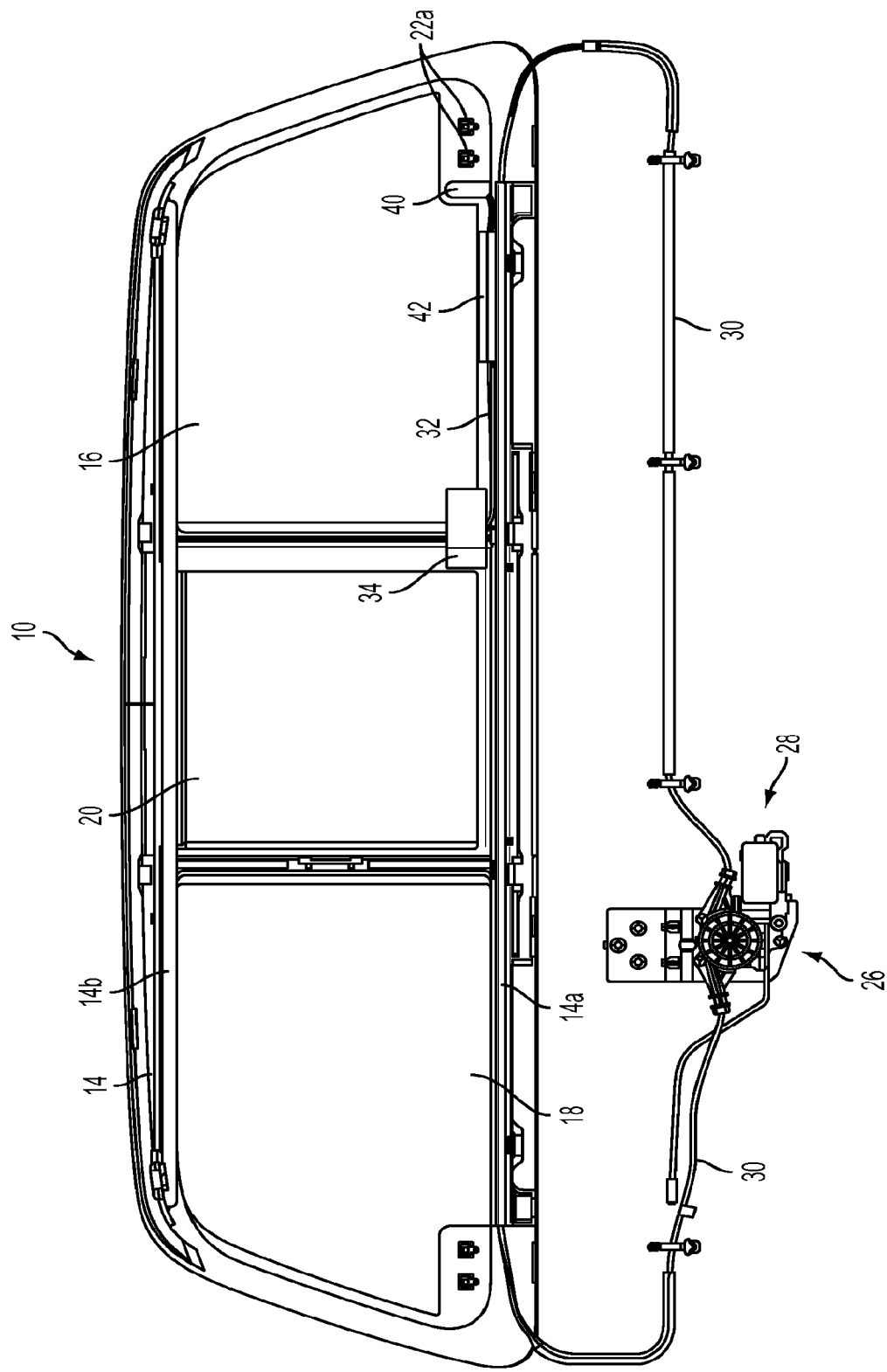
FIG. 2 is a front elevation of the rear slider window assembly of the present invention, as viewed from the forward or interior side of the window assembly when the window assembly is normally mounted to a vehicle.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1 and 2). Fixed window panels 16, 18 each include an electrically conductive heater grid 22 or other heating element or electrically operable element established on a surface of the window panels (such as at or on an interior surface of the window panels) and movable window panel 20 includes an electrically conductive heater grid or other heating element or electrically operable element 24 established on a surface of the window panel (such as at or on an interior surface of the movable window panel). The heater grids 22 are electrically conductively connected to (or are otherwise in electrical conductive continuity with) a power source of the vehicle and may be powered (such as responsive to a user actuatable input or switch or button of the vehicle) to heat or defrost or defog the fixed window panels 16, 18. Heater grid 24 is electrically connected to the power source (and may be electrically connected to electrical terminals or elements at one of the heater grids 22 of the fixed window panels) and may be electrically powered to heat or defrost or defog the movable window panel 20. Heater grid 24 of movable window panel 20 is powered in a manner that allows for heating or defogging or defrosting of the movable window panel irrespective of whether the movable window panel is opened or partially opened or closed, as discussed below.

Although shown and described as having a heater grid and providing electrical power or current to the heater grid to heat or defog or defrost the movable window panel of the rear slider window assembly, it is envisioned that electrical power/current may be provided to the movable window panel (when the movable window panel is closed and at least partially opened) for other functions or purposes while remaining within the spirit and scope of the present invention. For example, electrical power or electrical current or electrically conductive connections may be provided to the movable glass window panel for connecting to a radio antenna established at the movable window panel and/or carrier of the movable window panel (such as for receiving radio antenna signals or the like), or for powering/controlling lights and/or sensors (such as imaging sensors or photosensors or security/motion sensors or the like) established at the movable window panel and/or carrier or frame of the movable window panel, or for powering/controlling an electrical auto-dimming/shading glass panel (such as an electro-optic or electrochromic glass panel or the like) to provide a dimming/shading feature to the movable glass window panel, and/or the like. The electrical connections or electrically conductive connections to the movable window panel allow for provision of electrical power/current to the accessories or features or content of the movable window panel or at the movable window panel and/or may provide a data/signal transmitting/receiving function for the accessories or features or content of or at the movable window panel, with the connections providing such power/current/transmission/communication irrespective of the position of the movable window panel between its fully closed position and its fully opened position.

In the illustrated embodiment, window assembly 10 includes two fixed window panels 16, 18 that are spaced apart so as to define an opening therebetween. Slider or movable window panel 20 is movable along lower rail 14a and upper rail 14b of frame portion 14 to open and close the opening, such as in a manner similar to known slider window assemblies. Optionally, the slider window panel 20 may be disposed at a lower carrier that receives the lower perimeter edge region of the slider window panel 20 therein and that is slidably or movably received in the lower rail 14a of frame portion 14. The movable or slider window panel 20 is movable such as via manual pushing or pulling at the window panel or in response to actuation of a drive motor 26 of a drive motor assembly or system 28, which may move cables 30 or the like to impart horizontal movement of the slider window panel 20 along the rails 14a, 14b. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009; and/or 7,073,293, and/or U.S. patent application Ser. No. 10/454,040, filed Jun. 4, 2003, published Feb. 5, 2004 as U.S. Publication No. 2004-0020131, now abandoned; and/or Ser. No. 11/948,094, filed Nov. 30, 2007, published Jun. 5, 2008 as U.S. Publication No. 2008-0127563, now abandoned, which are all hereby incorporated herein by reference in their entireties.

Optionally, the window assembly or assemblies of the present invention may utilize aspects of the window assemblies described in U.S. Pat. Nos. 7,073,293; 7,003,916; and/or 6,691,464, and/or U.S. patent application Ser. No. 11/263,221, filed Oct. 31, 2005 by Nestell et al. for REAR SLIDER WINDOW ASSEMBLY FOR VEHICLE, published May 25, 2006 as U.S. Publication No. 2006-0107600, now abandoned; Ser. No. 11/948,094, filed Nov. 30, 2007, published Jun. 5, 2008 as U.S. Publication No. 2008-0127563, now abandoned; Ser. No. 10/454,040, filed Jun. 4, 2003 by Galer et al. for SLIDER WINDOW ASSEMBLY, published Feb. 5, 2004 as U.S. Publication No. 2004-0020131, now abandoned; and/or Ser. No. 10/408,047, filed Apr. 4, 2003 by Galer for SLIDER WINDOW ASSEMBLY, published Nov. 20, 2003 as U.S. Publication No. 2003-0213179, now abandoned, which are hereby incorporated herein by reference in their entireties.

Heater grids 22, 24 may comprise any suitable electrically conductive grids or coatings or layers established at the respective window panels. For example, the electrically conductive heater grids may comprise electrically conductive traces, such as electrically conductive silver flakes that are mixed with low melting glass and applied or screened as a thick film to a surface of the glass sheet for the window or to a ceramic frit layer on the surface of the glass sheet and then fired at a high temperature, such as in a known manner. The conductive material is established in a desired or appropriate pattern at the window panels, and a pair of terminals are established for electrically connecting a power source to the grid. In the illustrated embodiment, a pair of terminals 22a of heater grids 22 are established at a perimeter region of each of the fixed window panels (such as the lower outer corner region of the fixed window panels and such as at a frit-coated perimeter region of the window panel), and the terminals 22a (such as spade terminals or the like) are configured to electrically connect to connectors of a vehicle wire harness (not shown) or the like, such as in a known manner. Although referred to herein as heater grids, clearly other types of traces or patterns or coatings or layers or elements may be disposed at the surface of the window panels, such as to heat the window panels when powered (or as discussed above, other electrical content may also or otherwise be established at the movable window panel and electrically connected to the vehicle power source and/or control depending on the particular application and desired or selected electrical content of the rear slider window assembly), while remaining within the spirit and scope of the present invention. For example, a conductive coating, such as a transparent conductive coating or the like, may be disposed at the surface of the window panels and may be heated when power is applied thereto (such as when power is applied to conductive traces or busbars that are electrically conductively connected to opposite regions of the transparent conductive coating).

In the illustrated embodiment, electrical connection of the vehicle power source to heater grid 24 of movable window panel 20 is achieved via a flexible cable or wiring 32. For example, one end of the flexible cable 32 may connect to a pair of terminals or busbars (not shown) at the fixed window panel 18 (where the terminals may be electrically conductively connected to the terminals 22a of the heater grid 22 of fixed window panel 18, such as via respective metallic or otherwise electrically conductive traces established at the surface of the fixed window panel and between the respective terminals), while the other end of flexible cable 32 may connect to a pair of terminals or busbars at movable window panel 20 (where the terminals are electrically conductively connected to or established with the heater grid 24 of movable window panel 20).

Figure 5:
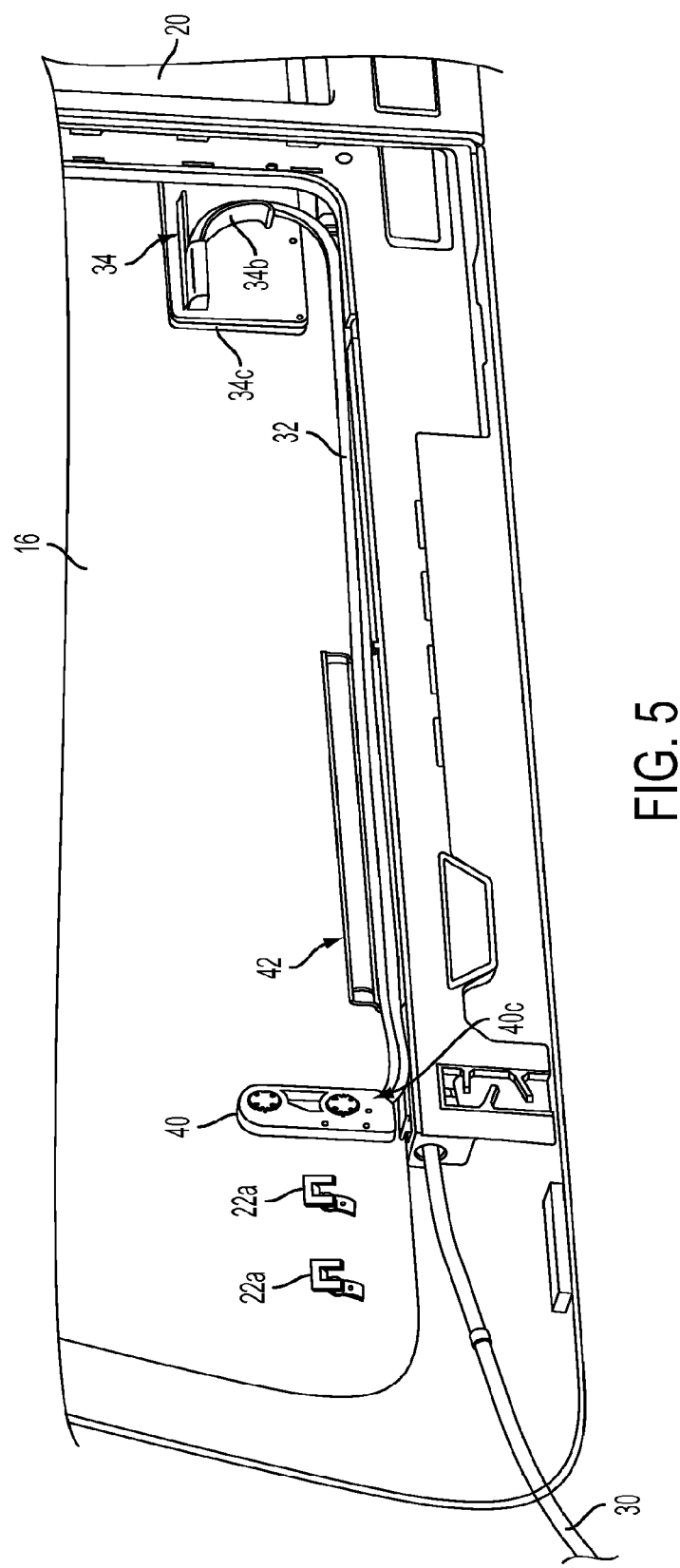
FIG. 5 is an opposite or rear perspective view of the lower portion of the rear slider window assembly of FIG. 4, as viewed from the rearward or exterior side of the window assembly when the window assembly is normally mounted to a vehicle, shown with the movable window in its closed position.
Figure 6:
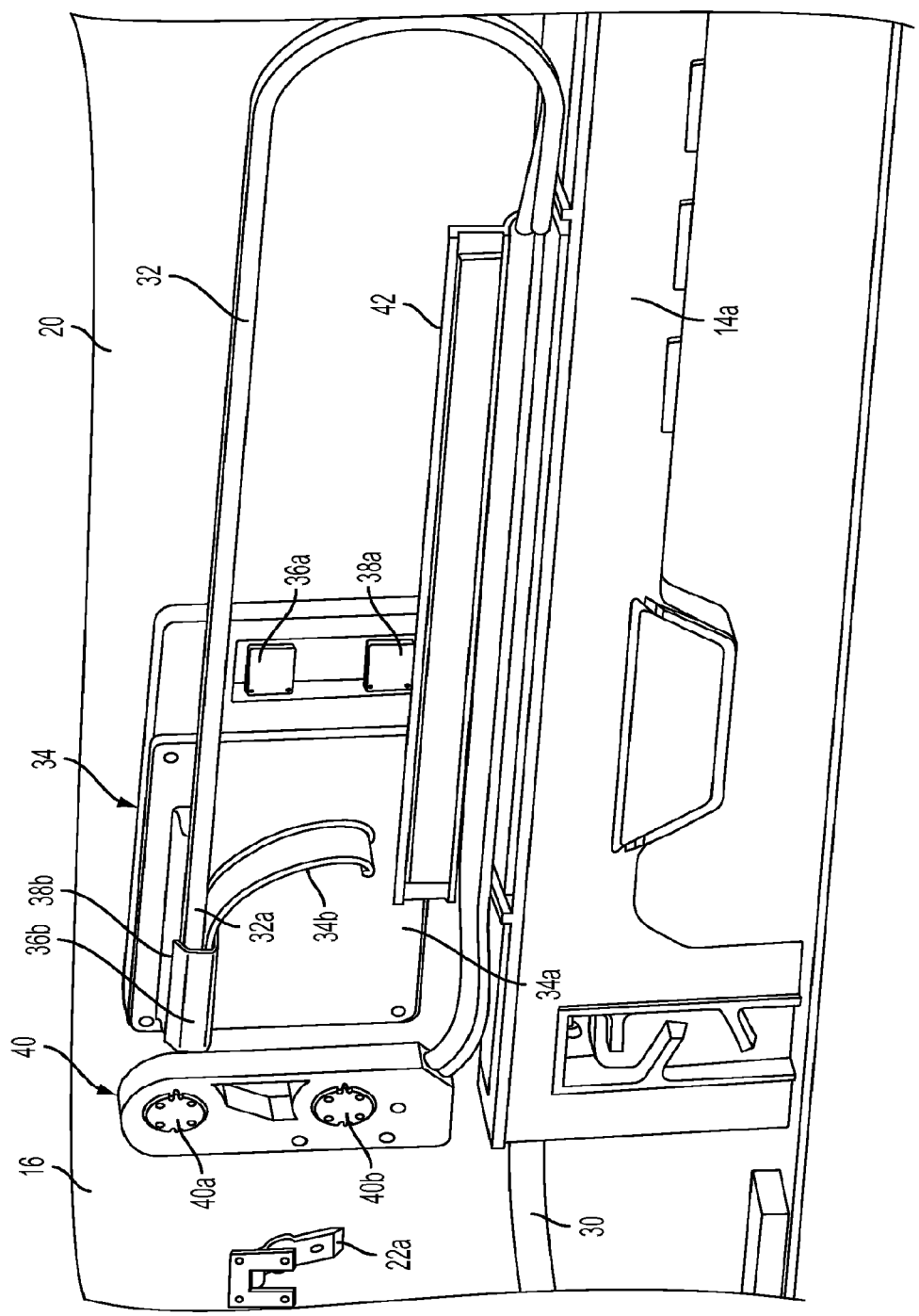
FIG. 6 is an enlarged rear perspective view of the lower portion of the rear slider window assembly of FIG. 5, shown with the movable window in its opened position.
Figure 7A:
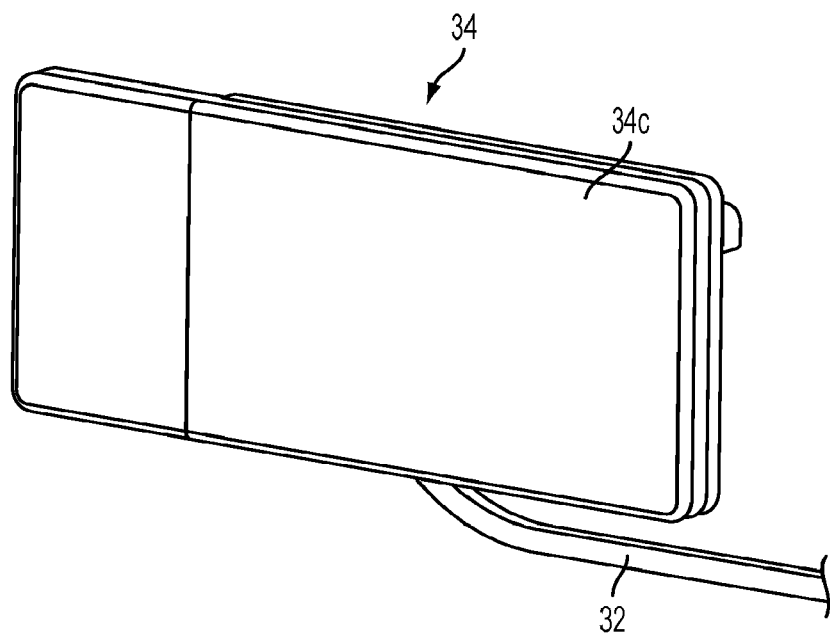
FIGS. 7A and 7B are opposite perspective views of the electrical connector at the movable window panel of the rear slider window assembly of FIG. 2.
Figure 7B:
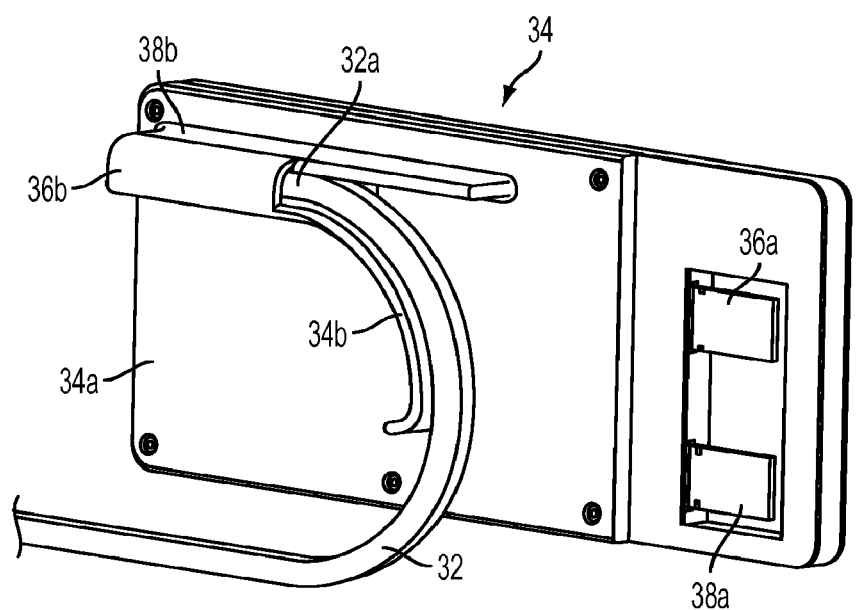

In the illustrated embodiment, movable window panel 20 includes an electrical connector 34 attached to window panel 20 and electrically conductively connected to the heater grid 24 of movable window panel 20. In the illustrated embodiment, electrical connector 34 extends from a lower corner region of movable window panel 20 and includes a pair of electrically conductive traces or elements established thereon or therein. The electrically conductive traces have one end 36a, 38a electrically conductively connected to respective terminals or portions of heater grid 24 (such as via soldering or adhering the ends 36a, 38a to the heater grid terminals), while the other end of the traces has a terminal or connector 36b, 38b established thereat. One end 32a of the flexible cable 32 connects to the terminals 36b, 38b of connector 34 and the flexible cable 32 is routed or curved or flexed downward toward and into and/or along the channel or lower rail portion of the frame of the window assembly. As shown in FIGS. 6 and 7B, the connector 34 may include a generally planar portion 34a and an arcuate guide element 34b established at its inner surface to guide the cable downward toward the lower rail or frame portion and to limit sharply bending or kinking the cable when the movable window panel is in its fully closed position (FIG. 5). Optionally, and desirably, the connector 34 may include an outer cover panel or element 34c that substantially covers and encapsulates or encompasses the terminals and conductive traces or elements to protect the electrical connections and to render them covert to a person viewing the window assembly.

Figure 8A:
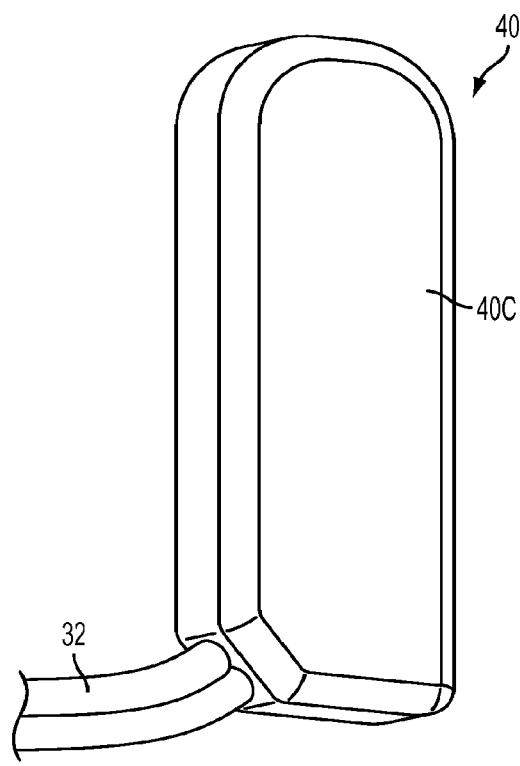
FIGS. 8A and 8B are opposite perspective views of the electrical connector at the fixed window panel of the rear slider window assembly of FIG. 2.
Figure 8B:
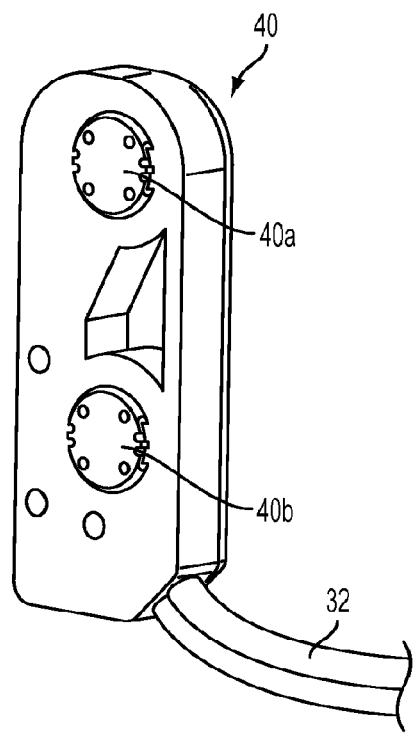

As shown in FIGS. 3 and 4-6, the opposite end 32b of the flexible cable 32 is connected to a connector 40 that is attached to or connected to the fixed window panel 18. The connector 40 (FIGS. 8A and 8B) receives the end 32b of flexible cable 32, whereby the ends of the wires of the flexible cable are electrically conductively connected to a pair of connectors or terminals 40a, 40b, which may be attached to or connected to respective conductive traces or terminals at the fixed window panel 18, such as at or near the connectors or terminals 22a of heater grid 22. Optionally, and desirably, the connector 40 may include an outer cover panel or element 40c that substantially covers and encapsulates or encompasses the terminals and conductive traces or elements to protect the electrical connections and to render them covert to a person viewing the window assembly.

Figure 3:
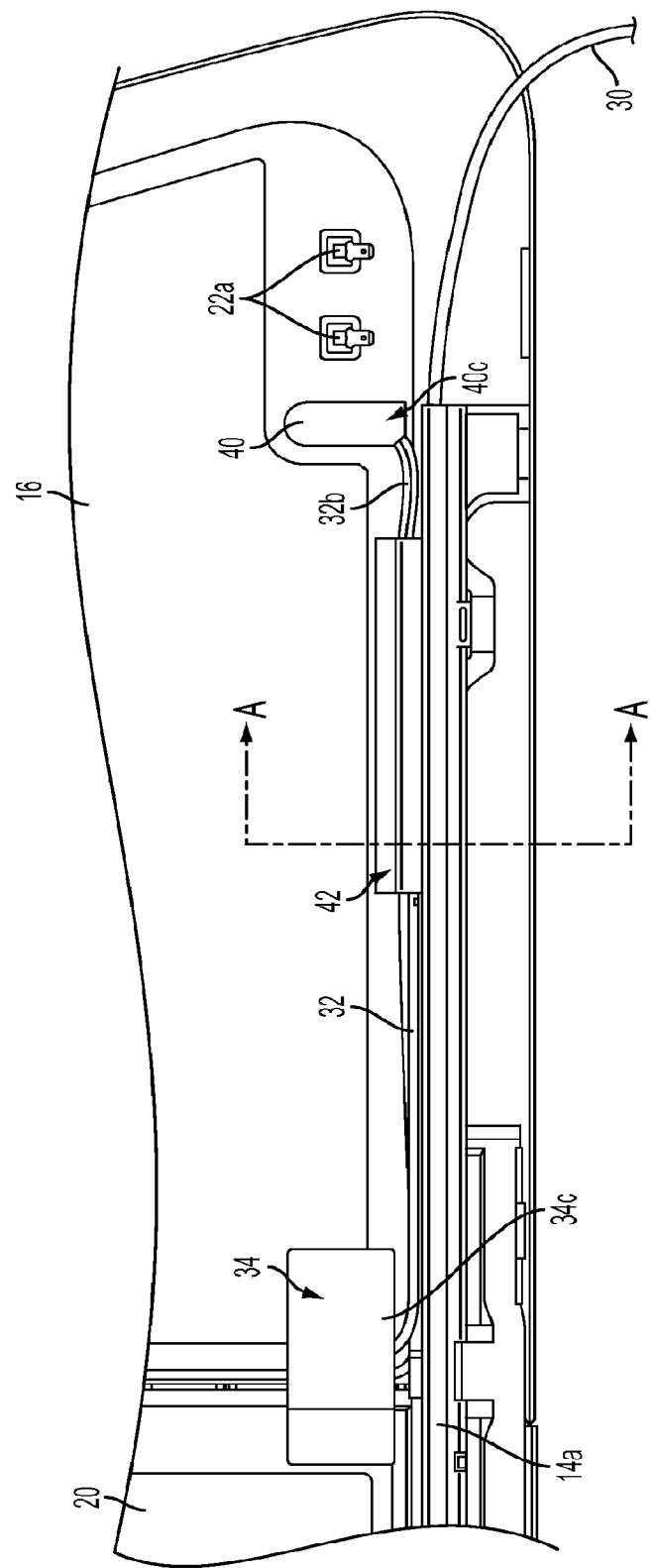
FIG. 3 is an enlarged front elevation of a lower portion of the rear slider window assembly of FIG. 2.
Figure 3A:
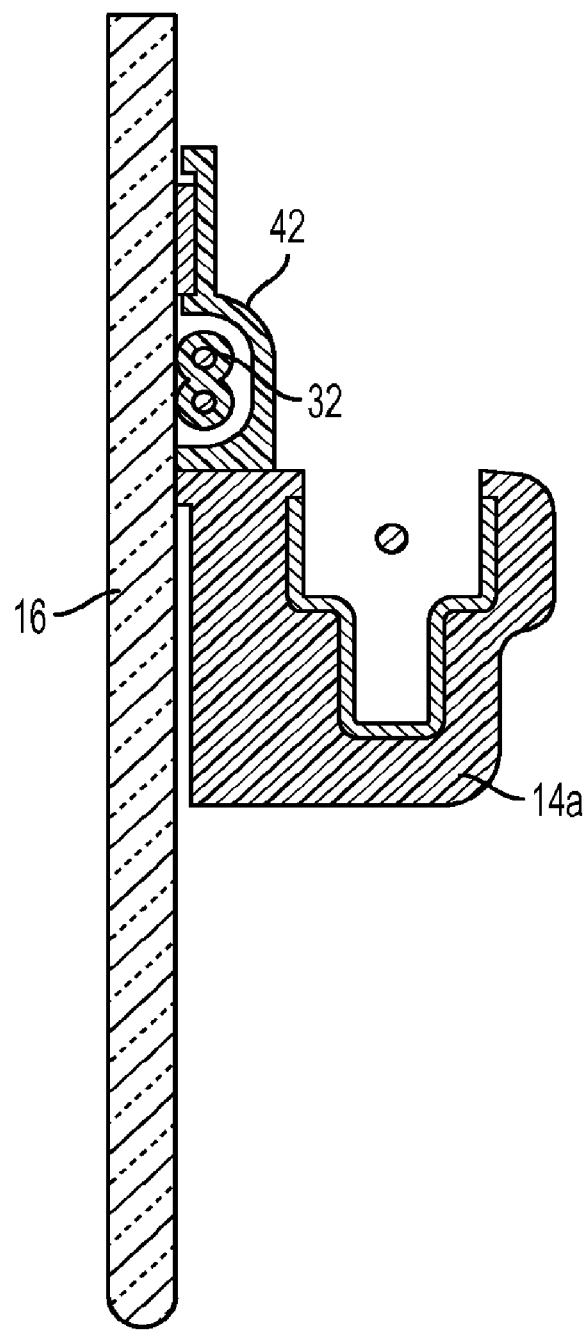
FIG. 3A is a sectional view of the rear slider window assembly taken along the line A-A in FIG. 3.
Figure 4:
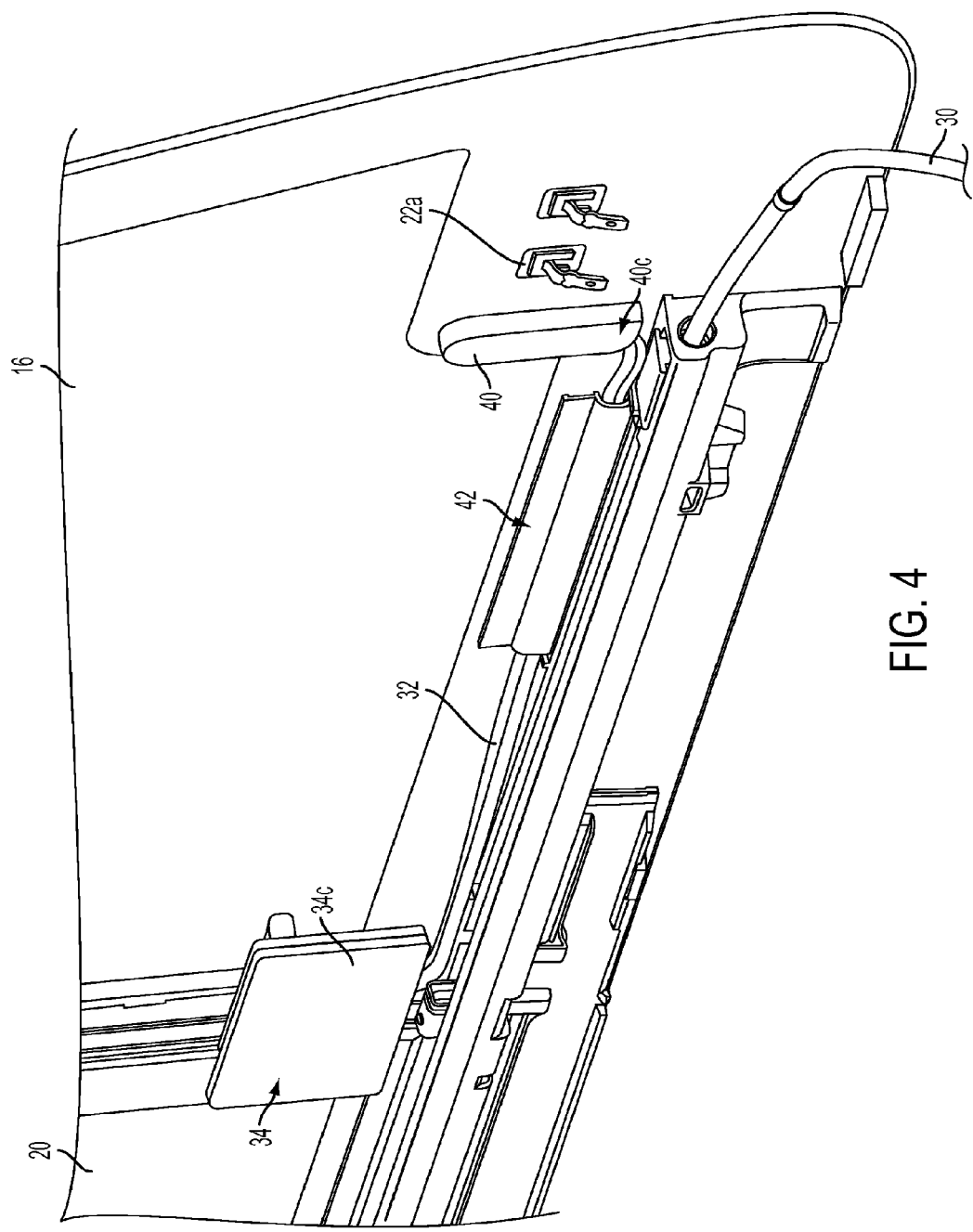
FIG. 4 is a perspective view of the lower portion of the rear slider window assembly of FIG. 3.

As can be seen in FIGS. 5 and 6, the cable 32 may flex to allow for movement of the movable window panel 20 between its opened position (FIG. 5) and its closed position (FIG. 6). In the illustrated embodiment, the flexible cable 32 comprises a pair of wires that are routed along the lower frame portion 14a and along a wire sleeve 42 disposed at the lower rail or lower frame portion 14a. As best shown in FIG. 6, wire sleeve 42 receives and guides a portion of the flexible cable 32, while the unguided portion is allowed to flex and curve as the movable window panel 20 is moved towards its opened position. In the illustrated embodiment, wire sleeve 42 is disposed along an upper portion of the lower rail 14a and may be adhered or bonded to the fixed window panel 16, such as shown in FIG. 3A. The location or height of the connector 34 and terminals 36b, 38b at movable window panel 20 is selected to allow for a suitable degree of curvature of the flexible cable 32 without sharply bending or kinking the cable throughout the range of motion of the movable window panel 20.

Thus, the flexible wire or cable functions to provide electrical connection to the heater grid of the movable window panel throughout the range of motion of the movable window panel between its fully closed position and its fully opened position. As the window panel is moved towards its opened position, the one end 32a of the flexible cable 32 moves with the movable window panel while the flexible cable flexes to allow for such movement. In the illustrated embodiment, the slider or movable window panel is movable towards the driver or left side of the vehicle when at least partially opened, but clearly, the slider may be moved in the other direction, with the components discussed herein reversed, depending on the particular application of the rear slider window assembly.

In the illustrated embodiment, flexible cable 32 comprises a pair of sleeved wires that are flexible and that flex in the desired or appropriate manner to allow for opening and closing of the movable window panel while maintaining electrical connection to the heater grid on the movable window panel. Although shown and described as having the movable window panel move towards one side of the vehicle (such as the driver side of the vehicle) when opening, clearly, the window assembly of the present invention may have the movable window panel move towards the other side of the vehicle (such as the passenger side of the vehicle) when opening, without affecting the scope of the present invention. Also, other forms of electrical connectors may be utilized at the fixed and/or movable window panels while remaining within the spirit and scope of the present invention.

Figure 9:
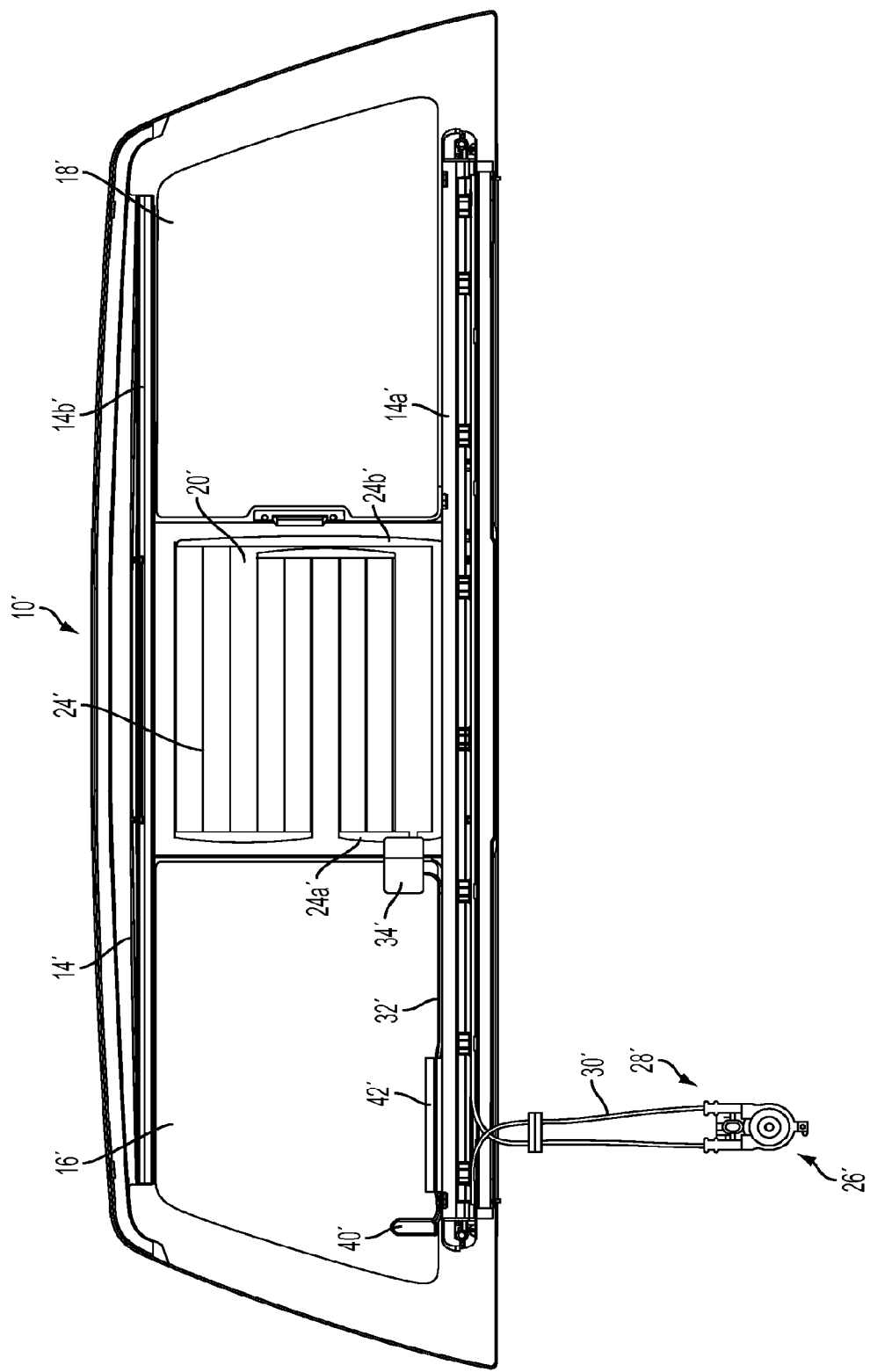
FIG. 9 is a rear elevation of another rear slider window assembly in accordance with the present invention.
Figure 10:
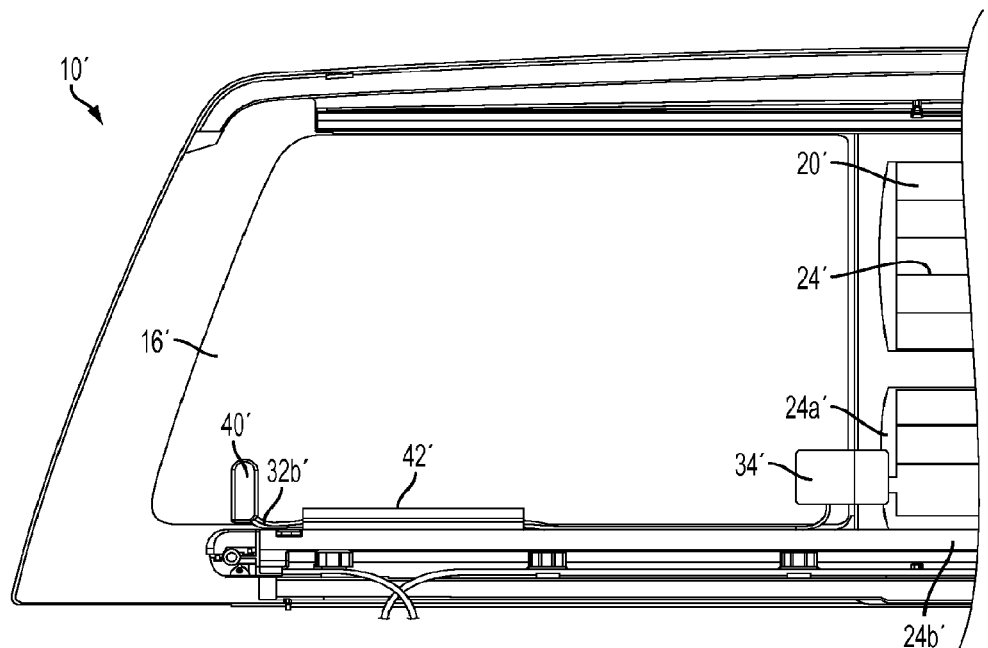
FIG. 10 is an enlarged rear elevation of one side portion of the rear slider window assembly of FIG. 9.
Figure 12:
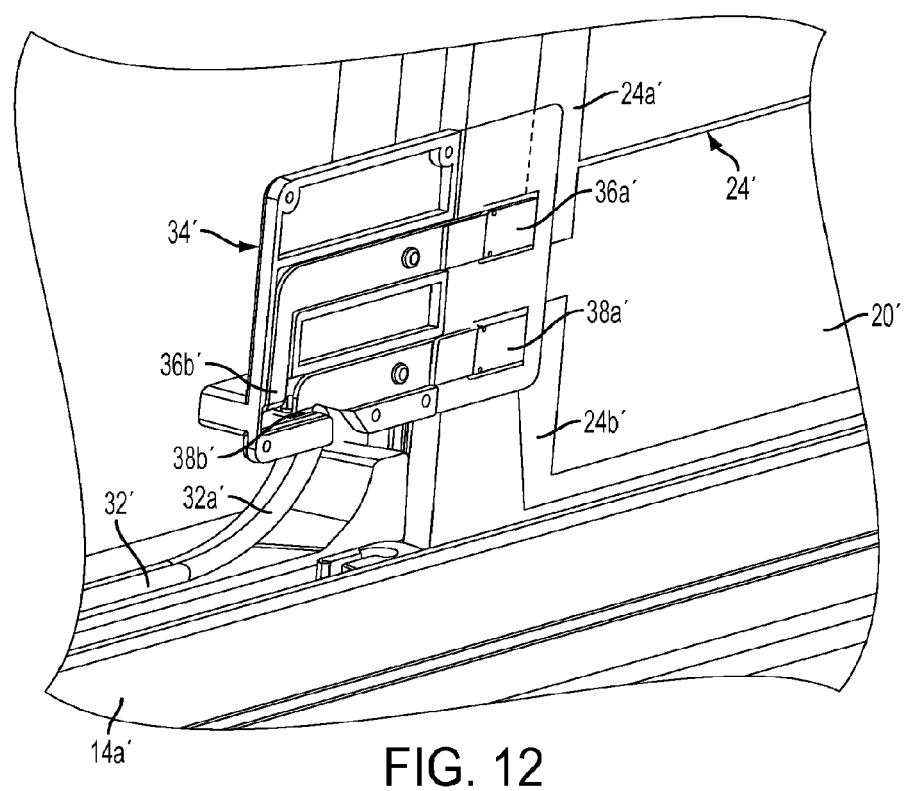
FIG. 12 is an enlarged rear perspective view of the electrical connection at the movable window panel of the rear slider window assembly of FIG. 9.
Figure 11:
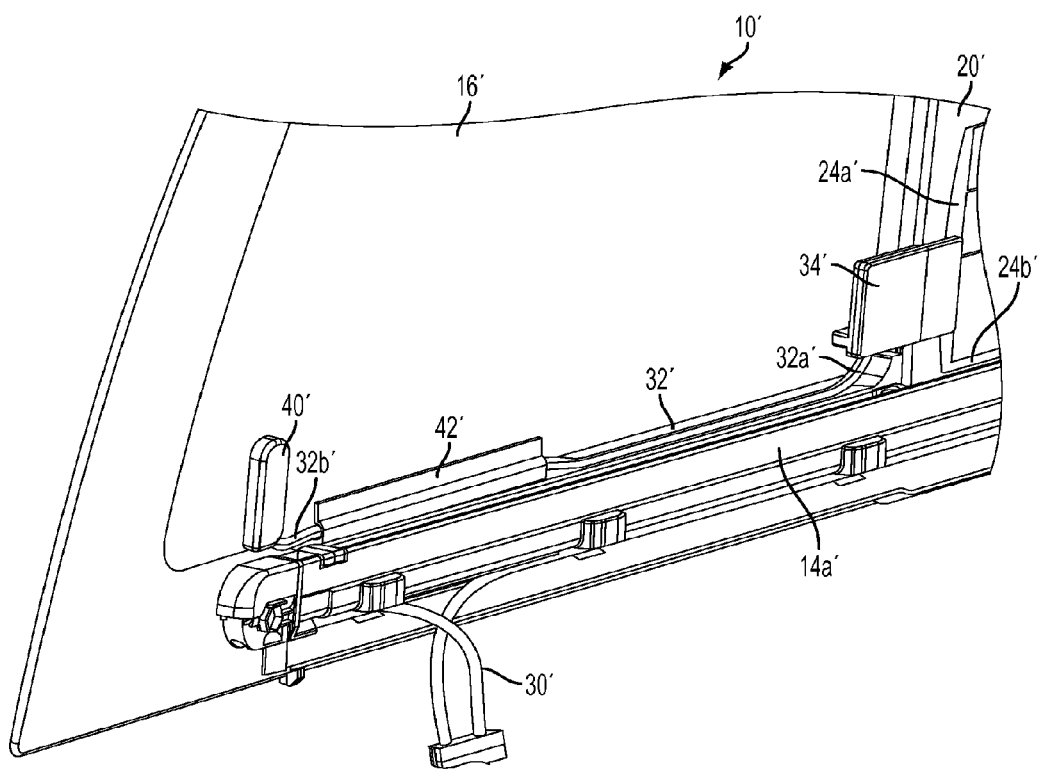
FIG. 11 is a perspective view of a lower portion of the side portion of the rear slider window assembly of FIG. 10.

For example, and with reference to FIGS. 9-11, a rear slider window assembly 10' of a vehicle (such as a pickup truck or the like) includes a window frame 14', a pair of side fixed window panels 16', 18' and a movable window panel 20' that is movable relative to frame 14' and fixed window panels 16', 18' between an opened position and a closed position. Fixed window panels 16', 18' each include an electrically conductive heater grid or other heating element or electrically operable element (not shown in FIGS. 9-11) established on a surface of the window panels (such as at or on an interior surface of the window panels) and movable window panel 20' includes an electrically conductive heater grid 24' or other heating element or electrically operable element established on a surface of the window panel (such as at or on an interior surface of the movable window panel). The heater grids of the fixed window panels are electrically conductively connected to (or are otherwise in electrical conductive continuity with) a power source of the vehicle and may be powered (such as responsive to a user actuatable input or switch or button of the vehicle) to heat or defrost or defog the fixed window panels 16', 18', while the heater grid 24' of movable window panel 20' is electrically connected to the power source via electrical connection to electrical terminals or elements at one of the heater grids of the fixed window panels, and may be electrically powered to heat or defrost or defog the movable window panel 20' in a manner that allows for heating or defogging or defrosting of the movable window panel irrespective of whether the movable window panel is opened or partially opened or closed, such as in a similar manner as discussed above.

Window assembly 10' may be substantially similar to window assembly 10, discussed above, and slider or movable window panel 20' is movable along lower rail 14a' and upper rail 14b' of frame portion 14' to open and close the opening, and may be movable via manual pushing or pulling at the window panel or in response to actuation of a drive motor 26' of a drive motor assembly or system 28', which may move cables 30' or the like to impart horizontal movement of the slider window panel 20' along the rails 14a', 14b'. The heater grids of the fixed window panels may be electrically conductively connected to the vehicle power source or wiring harness via one or more electrical terminals established at one or both window panels.

In the illustrated embodiment, electrical connection of the vehicle power source to heater grid 24' of movable window panel 20' is achieved via a flexible cable or wiring 32'. For example, one end of the flexible cable 32' may connect to a pair of terminals or busbars (not shown) at the fixed window panel 18' (where the terminals may be electrically conductively connected to the heater grid and/or terminals of the heater grid of fixed window panel 16', such as via respective metallic or otherwise electrically conductive traces established at the surface of the fixed window panel and between the respective terminals, such as discussed above), while the other end of flexible cable 32' may connect to a pair of terminals or busbars at movable window panel 20' (where the terminals are electrically conductively connected to or established with the heater grid 24' of movable window panel 20', such as also discussed above). As shown in FIGS. 9-12, the heater grid 24' of movable window panel 20' may have a first terminal end or trace 24a' (such as for connecting to a positive or negative wire of flexible cable 32') and a second terminal end or trace 24b' (such as for connecting to a negative or positive wire of flexible cable 32'), whereby the traces 24a', 24b' are electrically conductively connected to or established with respective traces or busbars at either side of the movable window panel with generally horizontal traces or heater grids extending therebetween.

In the illustrated embodiment, movable window panel 20' includes an electrical connector 34' attached to movable window panel 20' and electrically conductively connected to the traces 24a', 24b' of heater grid 24' of movable window panel 20'. In the illustrated embodiment, electrical connector 34' extends from a lower corner region of movable window panel 20' and includes a pair of electrically conductive elements 34a', 34b' established therein. The electrically conductive elements have one end 36a', 38a' electrically conductively connected to respective terminals or portions or traces 24a', 24b' of heater grid 24' (such as via soldering or adhering the ends 36a', 38a' to the heater grid traces), while the other end of the elements 34a', 34b' has a terminal or connector 36b', 38b' for electrically conductively connecting to the end 32a' of the flexible cable 32'. The flexible cable 32' is routed or curved or flexed downward toward and into and/or along the channel or lower rail portion of the frame of the window assembly, and the opposite end 32b' of the flexible cable 32' is connected to a connector 40' that is attached to or connected to the fixed window panel 16'. The cable 32' may flex to allow for movement of the movable window panel 20' between its opened position and its closed position, and may be routed along the lower frame portion 14a' and along a wire sleeve 42' disposed at the lower rail or lower frame portion 14a', such as in a similar manner as discussed above.

Figure 13:
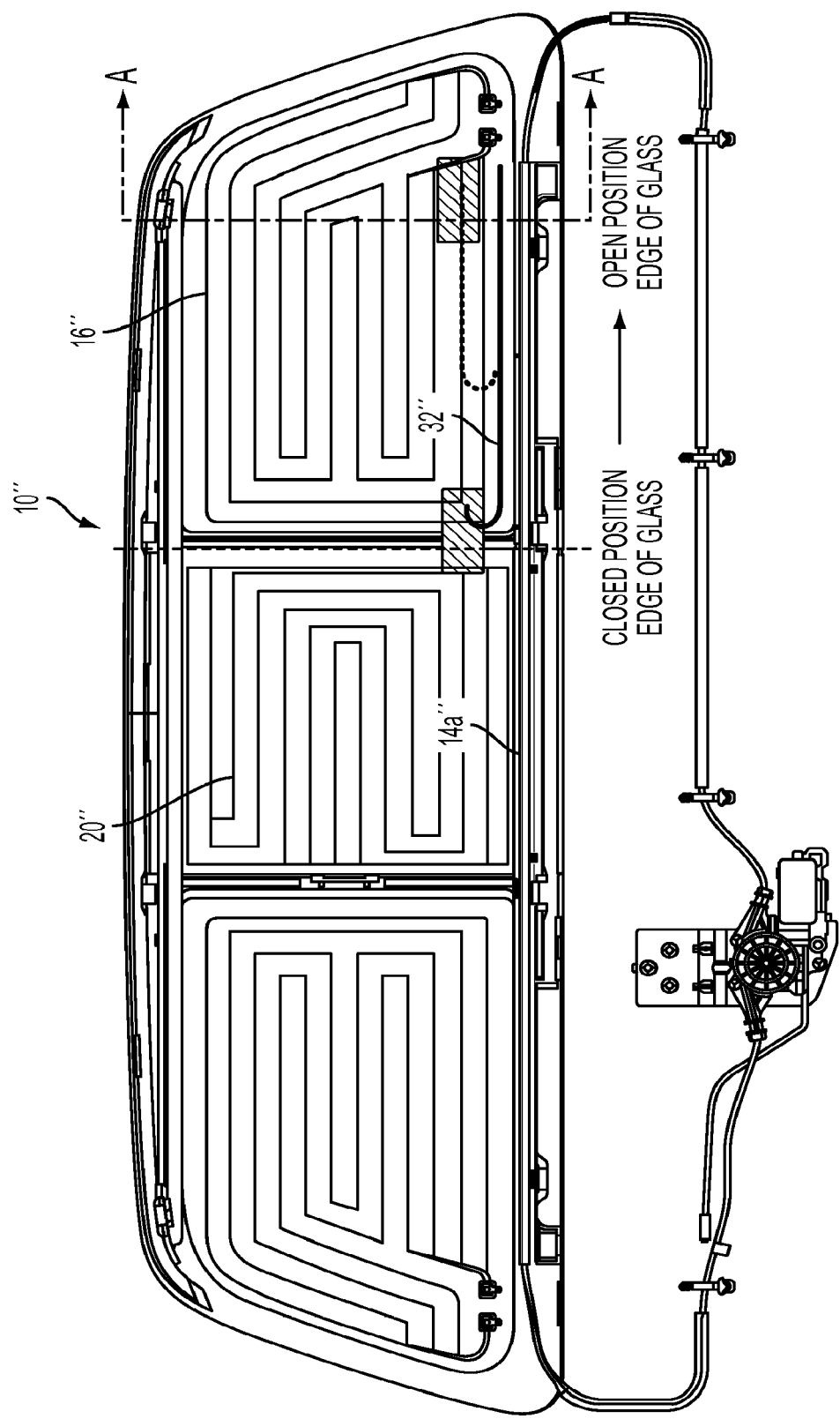
FIG. 13 is a rear elevation of the rear slider window assembly of the present invention.
Figure 13A:
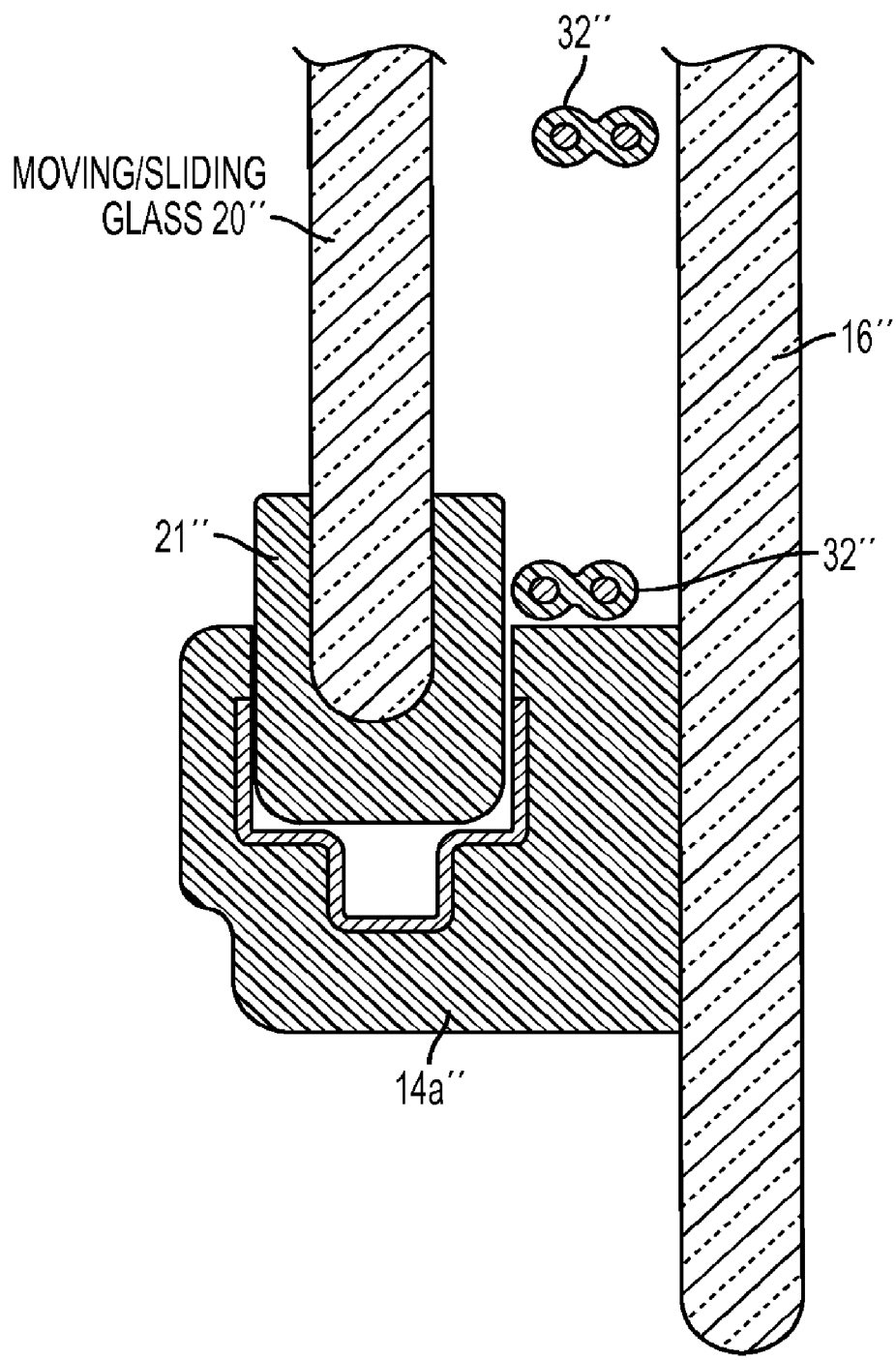
FIG. 13A is a sectional view of the rear slider window assembly taken along the line A-A in FIG. 13, shown with the movable window panel in an opened position.
Figure 14:
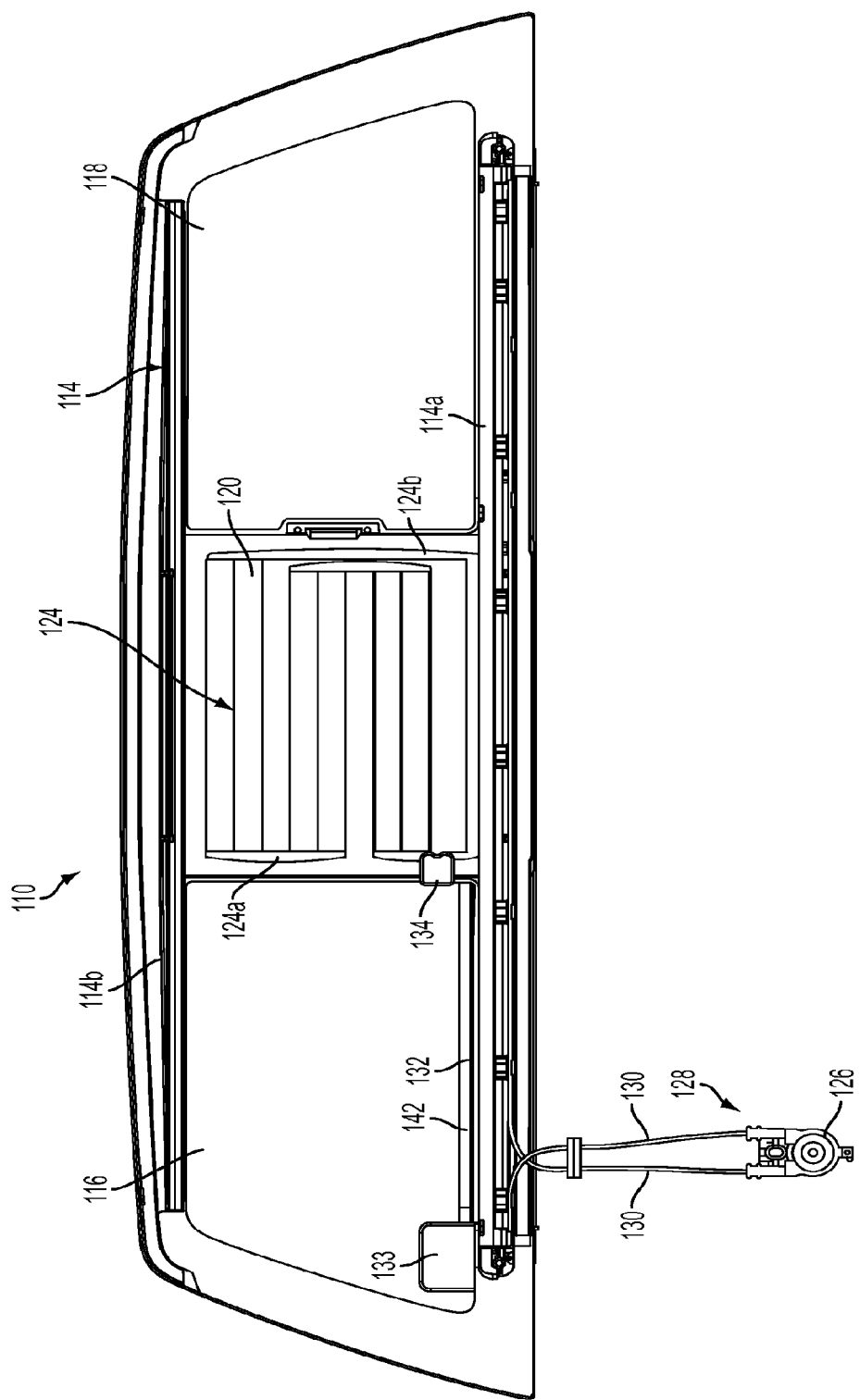
FIG. 14 is a rear elevation of another rear slider window assembly in accordance with the present invention, with a retractable electrical wiring connection.
Figure 15:
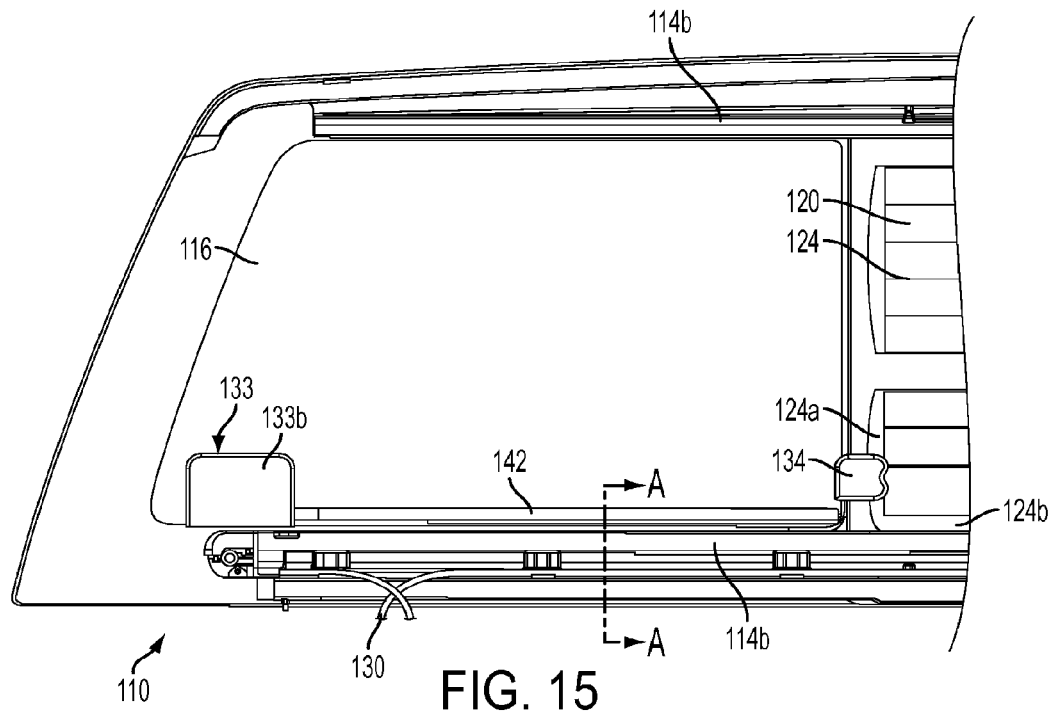
FIG. 15 is an enlarged rear elevation of one side portion of the rear slider window assembly of FIG. 14.
Figure 16:
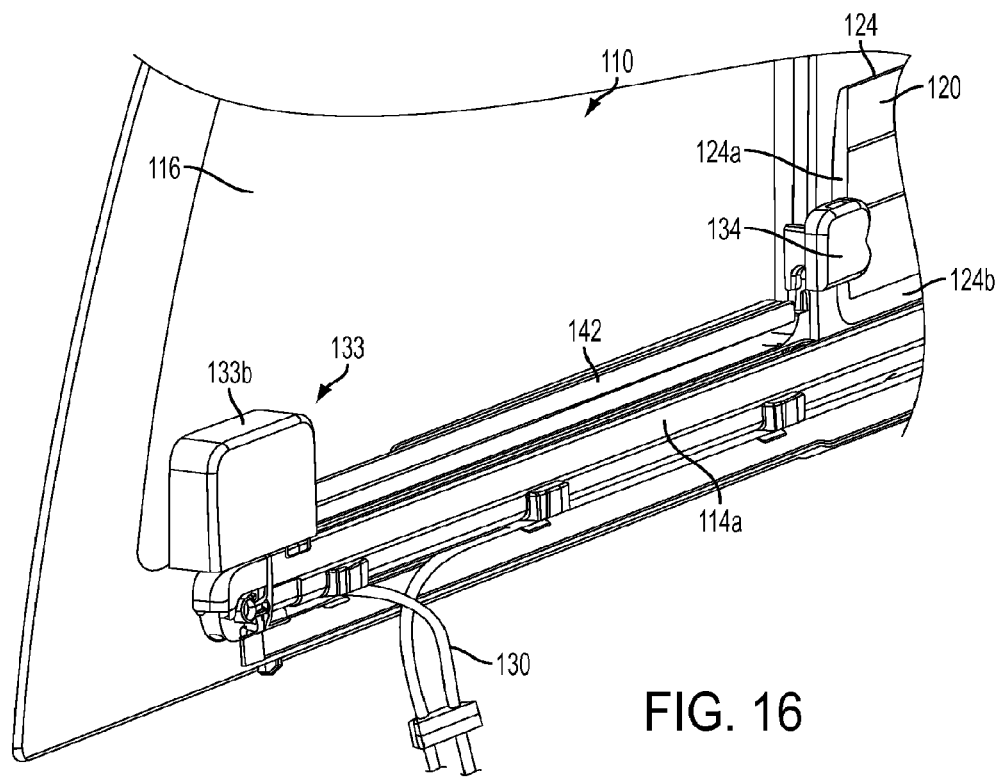
FIG. 16 is a perspective view of a lower portion of the side portion of the rear slider window assembly of FIG. 15.
Figure 15A:
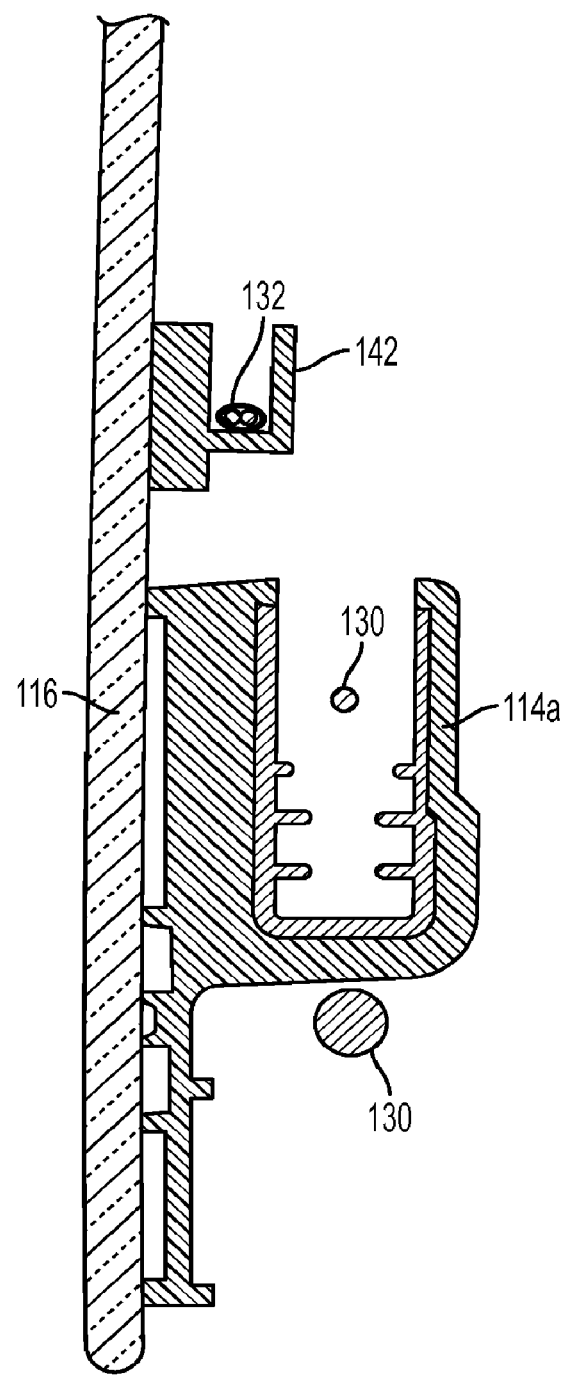
FIG. 15A is a sectional view of the rear slider window assembly taken along the line A-A in FIG. 15.
Figure 17:
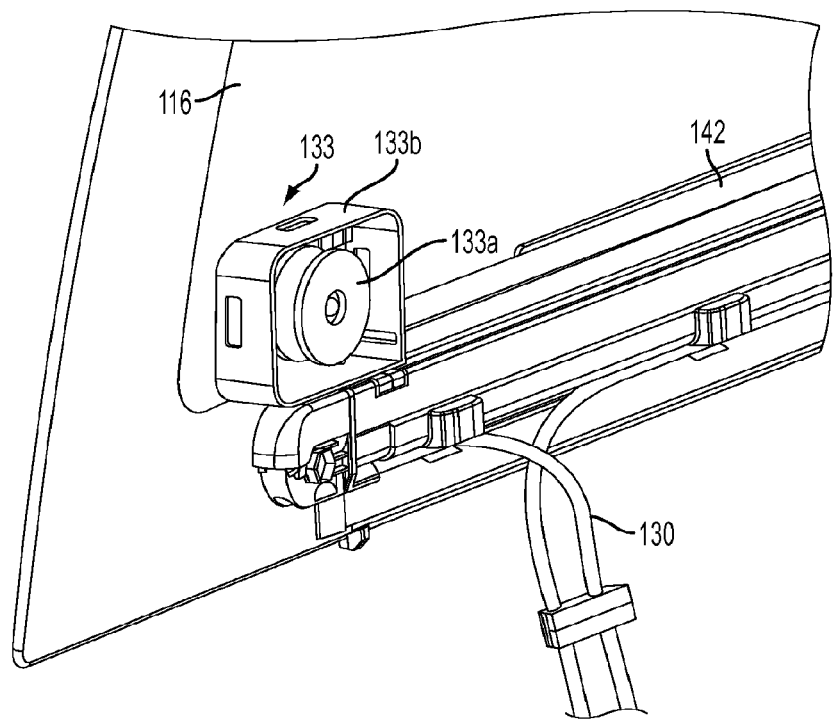
FIG. 17 is an enlarged perspective view of the retractable wire device, shown with its cover removed to show additional details.
Figure 18:
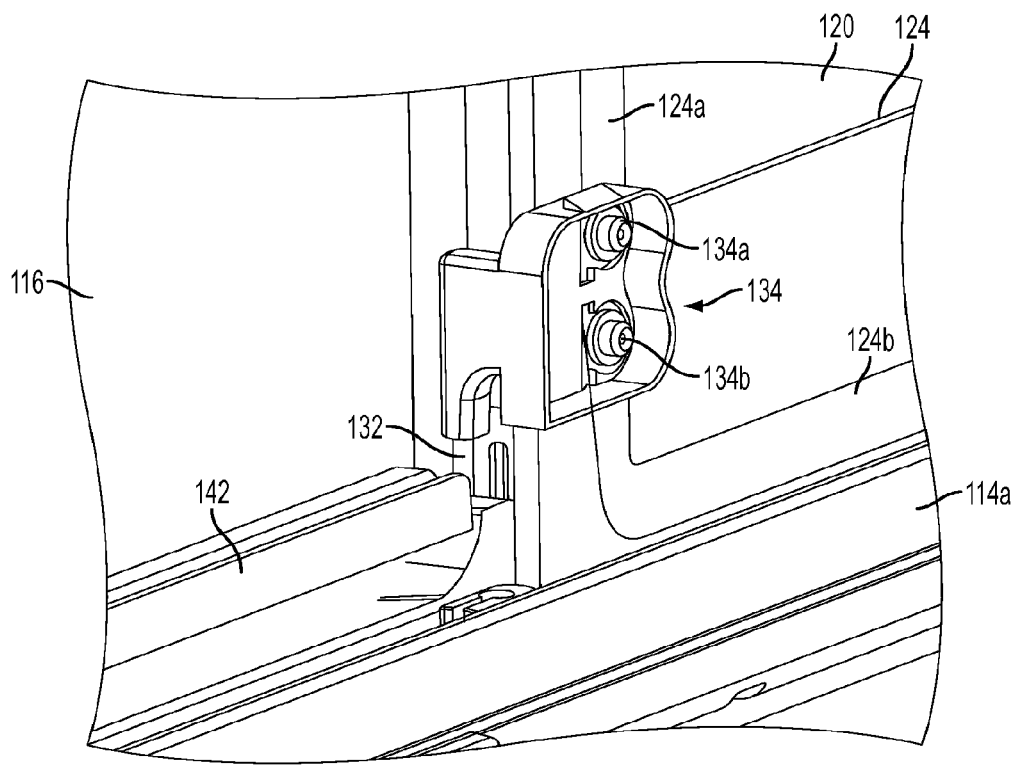
FIG. 18 is an enlarged rear perspective view of the electrical connection at the movable window panel of the rear slider window assembly of FIG. 14.

Optionally, other suitable connecting means may be implemented while remaining within the spirit and scope of the present invention. For example, and with reference to FIGS. 13 and 13A, the flexible cable 32" of a rear slider window assembly 10" may comprise a pair of wires routed along a flexible cable track that flexes in a controlled manner by allowing flexing in one direction while limiting flexing in the other direction. For example, the cable track may allow for flexing of the cable in the upward direction (to allow for movement of the cable end in a side-to-side or cross-car direction) while limiting or substantially precluding flexing of the cable in a fore-aft direction or the like. Thus, the movable window panel 20" may be moved between its opened and closed positions while the flexible cable remains generally aligned and disposed along the lower frame portion 14a" of the window assembly. Optionally, the slider window panel 20" may be disposed at a lower carrier 21" (FIG. 13A) that receives the lower perimeter edge region of the slider window panel 20" therein and that is slidably or movably received in the lower rail 14a" of the frame portion and relative to the fixed window 16".

Optionally, other cable routing configurations are contemplated, such as, for example, a flexible cable or wires that are routed along a channel at the frame portion of the window assembly to maintain the cables in a desired or appropriate routing configuration throughout the range of travel of the movable window panel, or the flexible cable or wires may comprise an extendable/retractable cord, such as a coiled cord (similar to a coiled cord commonly used for telephones and the like) that may be disposed along a channel at the frame portion and may stretch or extend to an extended orientation, such as when the movable window panel is in its closed position, and may retract to a retracted position, such as when the movable window panel is in its fully opened position. Optionally, the flexible cable or wires may comprise any other suitable configuration that allows for movement of the movable window panel between its opened and closed position while maintaining electrical connection to the heater grid on the movable window panel throughout the range of motion of the movable window panel.

For example, and with reference to FIGS. 14-18, a rear slider window assembly 110 of a vehicle (such as a pickup truck or the like) includes a window frame 114, a pair of side fixed window panels 116, 118 and a movable window panel 120 that is movable relative to frame 114 and fixed window panels 116, 118 between an opened position and a closed position. Fixed window panels 116, 118 each include an electrically conductive heater grid or other heating element or electrically operable element (not shown in FIGS. 14-18) established on a surface of the window panels (such as at or on an interior surface of the window panels) and movable window panel 120 includes an electrically conductive heater grid 124 or other heating element or electrically operable element established on a surface of the window panel (such as at or on an interior surface of the movable window panel). The heater grids of the fixed window panels are electrically conductively connected to (or are otherwise in electrical conductive continuity with) a power source of the vehicle and may be powered (such as responsive to a user actuatable input or switch or button of the vehicle) to heat or defrost or defog the fixed window panels 116, 118, while the heater grid 124 of movable window panel 120 is electrically connected to the power source via electrical connection to electrical terminals or elements at one of the heater grids of the fixed window panels, and may be electrically powered to heat or defrost or defog the movable window panel 120 in a manner that allows for heating or defogging or defrosting of the movable window panel irrespective of whether the movable window panel is opened or partially opened or closed, such as in a similar manner as discussed above. In the illustrated embodiment, electrical connection between the heater grid of the movable window panel and the power source of the vehicle is established via an extendable and retractable flexible cable or wire 132 that is wound around and/or retracted in a spool device 133 and that is extendable from or unwound from the spool device as the movable window is moved towards its closed position and is retractable into or wound onto/into the spool device as the movable window is moved towards its opened position.

Window assembly 110 may be substantially similar to window assembly 10, discussed above, and slider or movable window panel 120 is movable along lower rail 114a and upper rail 114b of frame portion 114 to open and close the opening, and may be movable via manual pushing or pulling at the window panel or in response to actuation of a drive motor 126 of a drive motor assembly or system 128, which may move cables 130 or the like to impart horizontal movement of the slider window panel 120 along the rails 114*a*, 114*b*. In the illustrated embodiment, electrical connection of the vehicle power source to heater grid 124 of movable window panel 120 is achieved via the extendable/retractable cable or wiring 132. One end of the flexible cable 132 thus may be electrically connected to the heater grid and/or terminals and/or traces of the heater grid of movable window panel 120 (such as via electrical connection or contact to respective metallic or otherwise electrically conductive traces established at the surface of the movable window panel), while the other end of flexible cable 132 may be electrically conductively connected to a pair of terminals or busbars (not shown) at or near the fixed window panel 116 (where the terminals may be electrically conductively connected to the power source of the vehicle), such as in a similar manner as discussed above.

As shown in FIGS. 14-18, spooling device 133 includes a spool 133*a*, which may be rotatably mounted at a casing or housing 133*b*, and may be biased or urged (such as via a torsional spring or the like) so that the spool rotates to wind the cable around the spool when the movable window panel is moved towards its open position. The end of the cable 132 that is wound onto the spool (and not the end that is attached at the movable window panel) may connect to electrically conductive terminals at the spool or may extend through the spool to connect to electrically conductive terminals at the fixed window panel or rail or frame or the like (such as via an electrical connection that allows for rotation of the end of the cable during extension/retraction of the cable while maintaining electrically conductive continuity with the terminals or busbars at the fixed window panel or frame throughout the range of movement of the movable window panel, such as via electrically conductive terminals that are disposed at or on or in an inner portion of the spool and that extend to an outer surface of the spool and that contact electrically conductive terminals at a base portion of the spooling device or mechanism while the spool is rotating or stationary). Optionally, the end of the cable 132 may be connected to respective electrically conductive terminals or elements (not shown) at the spool, and another wire may be electrically conductively connected between the terminals or elements at the spool and the vehicle power source, whereby the electrical conductivity between the cable 132 and the power source is established irrespective of whether the spool is stationary or rotating (such as via a rotational connection or sliding connection or the like at the spool).

In the illustrated embodiment, movable window panel 120 includes an electrical connector 134 attached to movable window panel 120 and electrically conductively connected to the traces 124*a*, 124*b* of heater grid 124 of movable window panel 120. In the illustrated embodiment, electrical connector 134 is disposed at and may extend from a lower corner region of movable window panel 120 and includes a pair of electrically conductive elements 134*a*, 134*b* established therein. The electrically conductive elements are electrically conductively connected to respective terminals or portions or traces 124*a*, 124*b* of heater grid 124 (such as via soldering or adhering the elements or portions thereof to the heater grid traces), while the end of the flexible cable 132 is electrically conductively connecting to the elements 134*a*, 134*b*, such as in a similar manner as discussed above. The flexible cable 132 is routed or curved or flexed downward toward and along the channel or lower rail portion of the frame of the window assembly, and may be routed along the lower frame portion 114*a* and along a wire sleeve or guide 142 disposed at the lower rail or lower frame portion 114*a*, such as in a similar manner as discussed above.

Thus, when the movable window panel is moved from its closed position towards its open position, spool 133*a* rotates to wind the flexible wire or cable 132 onto the spool (such as responsive to a rotational biasing force applied at the spool) while the extended portion of the cable 132 rests within and moves along the wire sleeve or guide 142. When the movable window panel 120 is moved towards its closed position, the spool 133*a* rotates in the opposite direction to unwind the flexible wire or cable from the spool to allow for extension of the wire or cable during the movement of the movable window panel away from the spool. A housing or casing or cover 133*b* may be provided to substantially encase the spool and may have one or more passageways formed therethrough for passage of the flexible cable and/or for passage of electrical connectors or terminals that electrically conductively connect the inner end of the flexible cable to the power source of the vehicle. Although shown and described with the spooling mechanism disposed at the fixed window panel, it is envisioned that the spooling mechanism or device may be disposed at the frame portion or may be disposed at the movable window panel (with the opposite end of the flexible cable connected to terminals at the fixed window panel or frame portion), while remaining within the spirit and scope of the present invention.

Optionally, it is envisioned that the extendable/retractable electrical connection or flexible cable may be disposed elsewhere at the window assembly, such as, for example, along an upper rail or channel portion of the window assembly. Optionally, the flexible cable may comprise a flexible ribbon cable or conductive strip that is flexible in one direction and substantially restricts or limits flexing in other directions.

Figure 19:
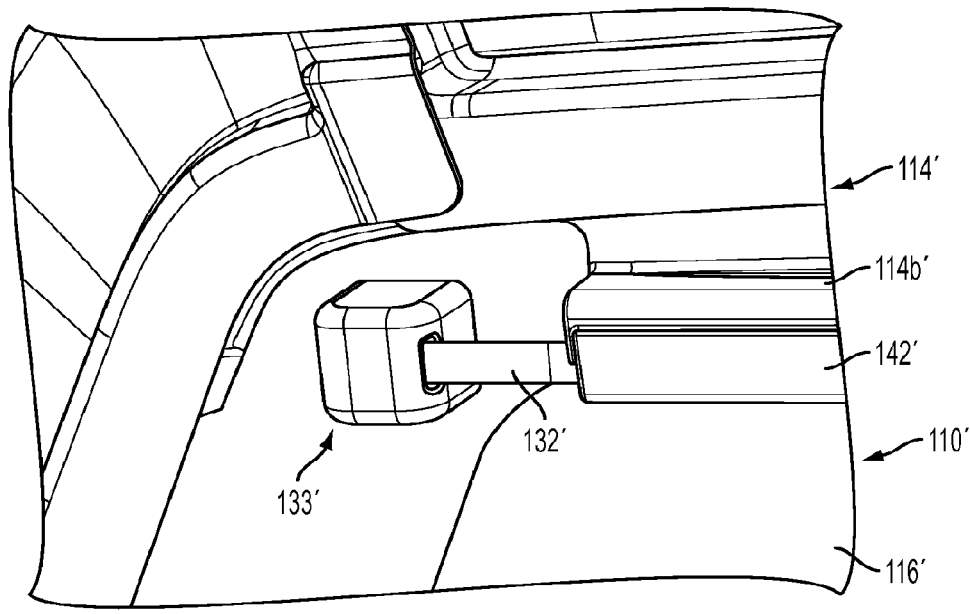
FIG. 19 is a perspective view of an upper corner portion of another rear slider window assembly in accordance with the present invention, with an extendable/retractable electrical wiring connection.
Figure 20A:
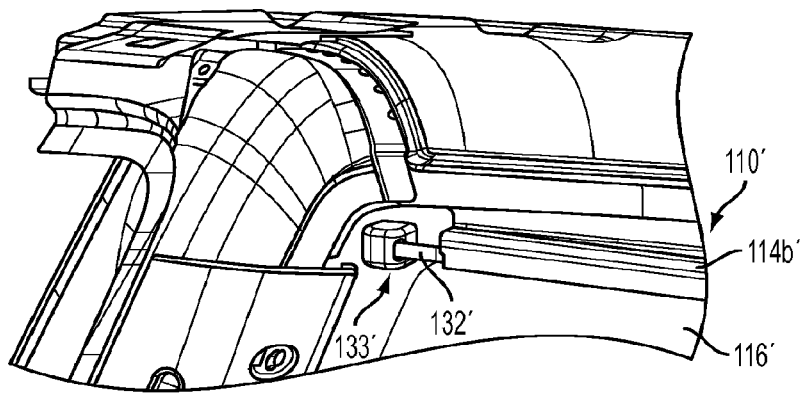
FIG. 20A is another perspective view of the upper corner portion of the rear slider window assembly of FIG. 19.
Figure 20B:
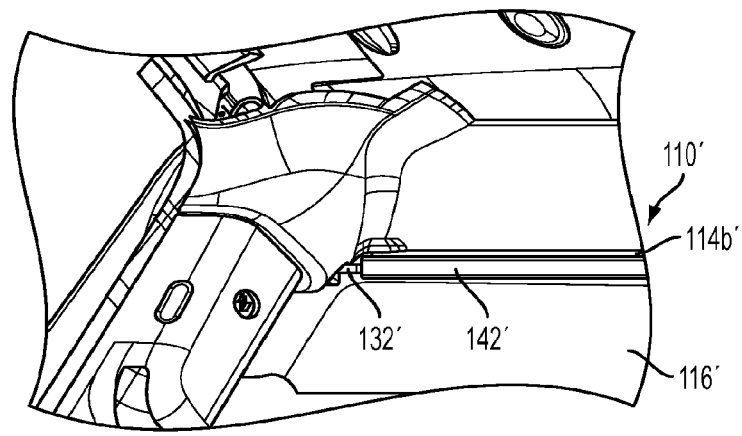
FIG. 20B is another perspective view of the upper corner portion of the rear slider window assembly of FIG. 19, shown with the trim elements mounted at the vehicle to limit viewability of the spooling mechanism.

Optionally, for example, and with reference to FIGS. 19-21, a heated rear slider window assembly 110' may comprise an extendable/retractable electrical connection between terminals or busbars at or near the fixed window panel 116' or frame 114' and terminals or busbars at the movable window panel (not shown in FIGS. 19-21) that extends along the upper rail or channel 114*b*' of the frame 114' of the window assembly and along one of the fixed window panels 116'. In the illustrated embodiment, electrical connection between the heater grid of the movable window panel and the power source of the vehicle is established via an extendable and retractable flexible cable 132' that is wound around and/or retracted in a spool device 133' and that is extendable from or unwound from the spool device as the movable window is moved towards its closed position and is retractable into or wound onto/into the spool device as the movable window is moved towards its opened position, such as in a similar manner as discussed above. As can be seen with reference to FIGS. 20A and 20B, when the vehicle window assembly is installed or mounted at a vehicle and the vehicle interior trim components are attached at the window assembly, the spool device 133' is substantially not viewable (FIG. 20B) to a person viewing the window assembly (such as from inside the vehicle) as installed at a vehicle. Optionally, and desirably, the window panels may include an opaque coating or layer (such as a black ceramic frit layer or the like) at their upper and lower perimeter regions so that the spool device and rail portion and flexible cable are also not readily viewable to a person viewing the window assembly from outside of the vehicle.

Window assembly 110' may be substantially similar to window assembly 110, discussed above, such that a detailed discussion of the window assemblies need not be repeated herein. In the illustrated embodiment, electrical connection of the vehicle power source to the heater grid of the movable window panel is achieved via the extendable/retractable cable 132'. One end of the flexible cable 132' thus may be electrically connected to the heater grid and/or terminals and/or traces of the heater grid of the movable window panel (such as via electrical connection or contact to respective metallic or otherwise electrically conductive traces established at the surface of the movable window panel), while the other end of flexible cable 132' may be electrically conductively connected to a pair of terminals or busbars (not shown) at or near the fixed window panel 116' (where the terminals may be electrically conductively connected to the power source of the vehicle), such as in a similar manner as discussed above.

As shown in FIGS. 19-21, spooling device 133' includes a spool 133a', which may be rotatably mounted at a casing or housing 133b' and on a base portion 133c', and may be biased or urged (such as via a biasing element or spring 133d' or the like) so that the spool rotates to wind the cable around the spool when the movable window panel is moved towards its open position. The base portion 133c' may be attached at the surface of the fixed window panel 116', such as via an adhesive tape or the like (such as via tape disposed at a recess 133e' established at the base portion 133c'), and the housing 133b' may be attached or snapped over the base portion to retain the housing on the base portion at the fixed window panel. The flexible cable 132' may be wound around the spool 133a' at base portion, and the biasing element or spring 133d' (such as a Vulcan spring or constant force spring or the like, which provides a substantially constant or uniform force as it imparts rotational movement of the spool 133a' during retraction of the cable) biases the spool 133a' relative to the base portion 133c' to retract or wind the cable 132' onto the spool 133a'. For example, the spring or biasing element 133d' may provide a force of about 0.25 inch/lbs of torque with a 1 pound pull force. The spring may, for example, be about 8 mm wide and may be coiled to provide 11.5 total allowable turns between the fully retracted and fully extended positions.

The end of the cable 132' that is wound onto the spool (and not the end that is attached at the movable window panel) may connect to electrically conductive terminals at the spool or may extend through the spool to connect to electrically conductive terminals at the fixed window panel or rail or frame or the like (such as via an electrical connection that allows for rotation of the end of the cable during extension/retraction of the cable while maintaining electrically conductive continuity with the terminals or busbars at the fixed window panel or frame throughout the range of movement of the movable window panel). Optionally, the end of the cable 132' may be connected to respective electrically conductive terminals or elements (not shown) at the spool, and another wire may be electrically conductively connected between the terminals or elements at the spool and the vehicle power source, whereby the electrical conductivity between the cable 132' and the power source is established irrespective of whether the spool is stationary or rotating (such as via a rotational connection or sliding connection or the like at the spool). As shown in FIG. 21D, the housing 133b' may be sized with a gap 133f at or next to the spool 133a' to allow for clearance for the electrical connection to be made between the flexible wire or cable 132' and the terminals at the fixed window panel or frame.

In the illustrated embodiment, the flexible cable 132' is routed or curved or flexed downward toward and along the upper channel or upper rail portion 114b' of the frame 114' of the window assembly 110', and may be routed along the upper frame portion 114b' and along a wire sleeve or guide 142' disposed at the upper rail or frame portion 114b', such as in a similar manner as discussed above. Flexible cable 132' may comprise a generally planar or thin ribbon cable or flat wire, such as a thin ribbon cable or flat wire with a pair of flexible conductive traces or strips disposed along the ribbon or flat wire element. Optionally, for example, the ribbon cable may have a pair of conductive traces or conductors that are spaced apart (such as by about 0.08 inches or 0.1 inches or more or less, depending on the particular application and selected ribbon cable) and that form a thin strip (such as a strip having a thickness of less than 0.02 inches or less than about 0.014 inches or more or less depending on the particular application and selected ribbon cable) that is flexible to facilitate coiling and uncoiling of the flexible ribbon cable during opening and closing of the movable window panel. The conductors may have a width of around 0.1 inches or 0.12 inches or more or less and a thickness of around 0.005 inches or 0.006 inches or more or less, depending on the particular application and selected ribbon cable, and the insulation material along which the conductors are disposed may comprise any suitable non-electrically conducting material, such as a polyester material or the like.

Thus, when the movable window panel is moved from its closed position towards its open position, spool 133a' rotates to wind the flexible cable 132' onto the spool (such as responsive to a rotational biasing force applied at the spool) while the extended portion of the cable 132' rests within and moves along the wire sleeve or guide 142'. When the movable window panel is moved towards its closed position, the spool 133a' rotates in the opposite direction to unwind the flexible wire or cable from the spool to allow for extension of the wire or cable during the movement of the movable window panel away from the spool. The extendable/retractable flexible cable thus establishes and maintains electrically conductive continuity or connection between the vehicle power source (or via the heater grid on the fixed window panel or other electrically conductive terminals or traces at the fixed window panel or the frame) and the heater grid (or other electrically powered accessory or element) at or on the movable window panel throughout the range of motion of the movable window panel between its fully opened and fully closed positions. Although shown and described with the spooling mechanism disposed at the fixed window panel, it is envisioned that the spooling mechanism or device may be disposed at the frame portion or may be disposed at the movable window panel (with the opposite end of the flexible cable connected to terminals at the fixed window panel or frame portion), while remaining within the spirit and scope of the present invention.

Optionally, it is envisioned that other electrically conductive connecting means may be implemented to establish and maintain electrical connection between the vehicle power source and the heater grid on the movable window panel throughout the range of motion of the movable window panel between its fully opened and fully closed positions. For example, it is envisioned that electrically conductive raceways or busbars may be established along the fixed window panel and a pair of electrical contacts at the movable window panel may electrically conductively contact the respective busbars as the movable window panel is moved between its opened and closed positions. For example, the electrical contacts may comprise rollers or sliding contacts or the like. Optionally, the busbars may be established along the movable window panel with the electrical contacts established at the fixed window panel.

Optionally, for example, and with reference to FIGS. 22-26, a rear slider window assembly 210 of a vehicle (such as a pickup truck or the like) includes a window frame 214, a pair of side fixed window panels 216, 218 and a movable window panel 220 that is movable relative to frame 214 and fixed window panels 216, 218 between an opened position and a closed position. Fixed window panels 216, 218 each include an electrically conductive heater grid or other heating element or electrically operable element (not shown in FIGS. 22-26) established on a surface of the window panels (such as at or on an interior surface of the window panels) and movable window panel 220 includes an electrically conductive heater grid 224 or other heating element or electrically operable element established on a surface of the window panel (such as at or on an interior surface of the movable window panel). In the illustrated embodiment, electrical connection between the heater grid of the movable window panel and the power source of the vehicle is established via an electrically conductive raceway or element 232 that is attached at and extends along the fixed window panel 216 and that is electrically conductively connected to the power source of the vehicle, whereby an electrically conductive connector or element 234 is electrically conductively connected to heater grid 224 of movable window panel 220 and is electrically conductively connected to the electrically conductive raceway 232 (such as via sliding or rolling engagement with the raceway) irrespective of the position of the movable window panel and as the movable window is moved between its closed position and its opened position.

Figure 22:
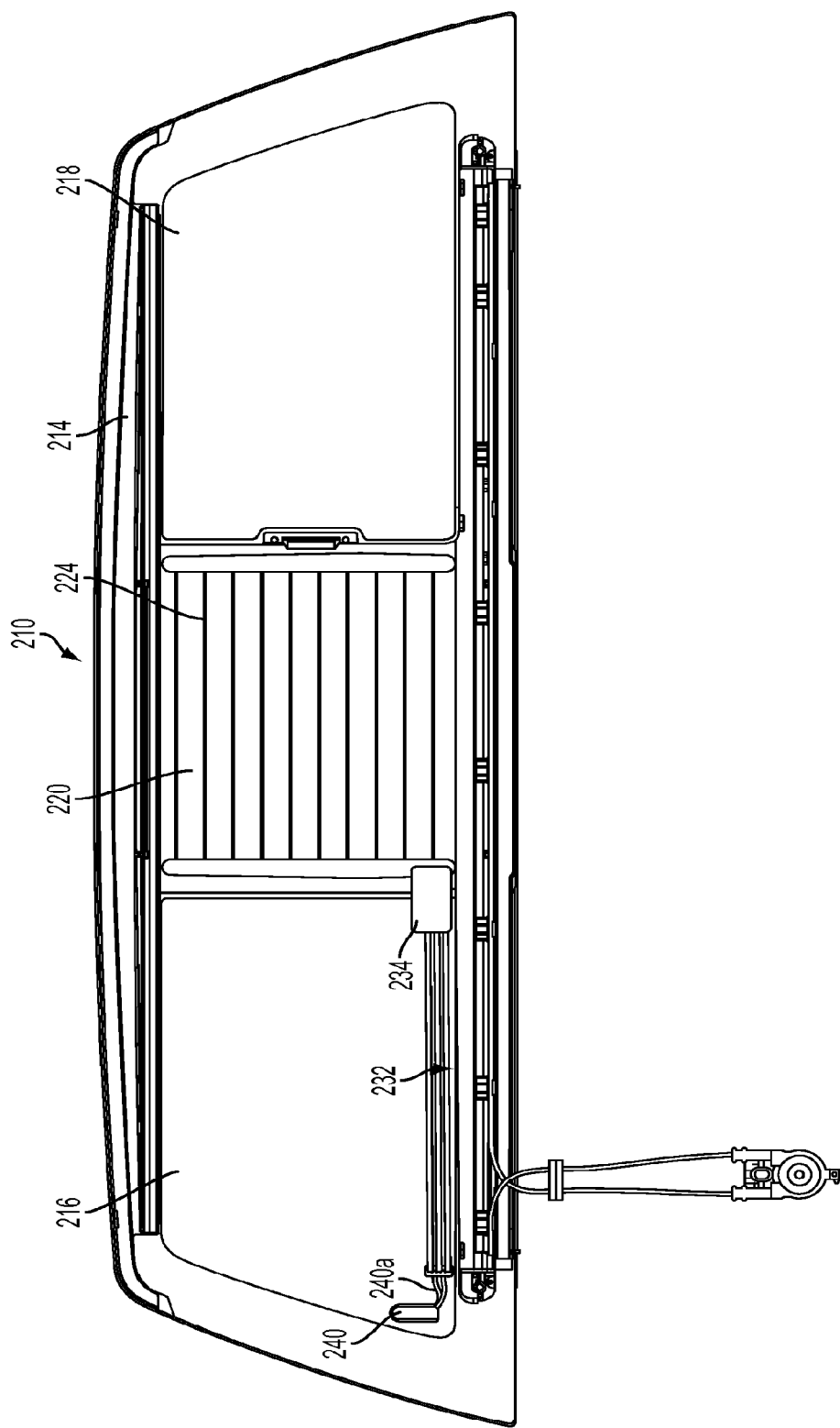
FIG. 22 is a rear elevation of another rear slider window assembly in accordance with the present invention, with an electrically conductive raceway established along one of the fixed window panels.
Figure 23:
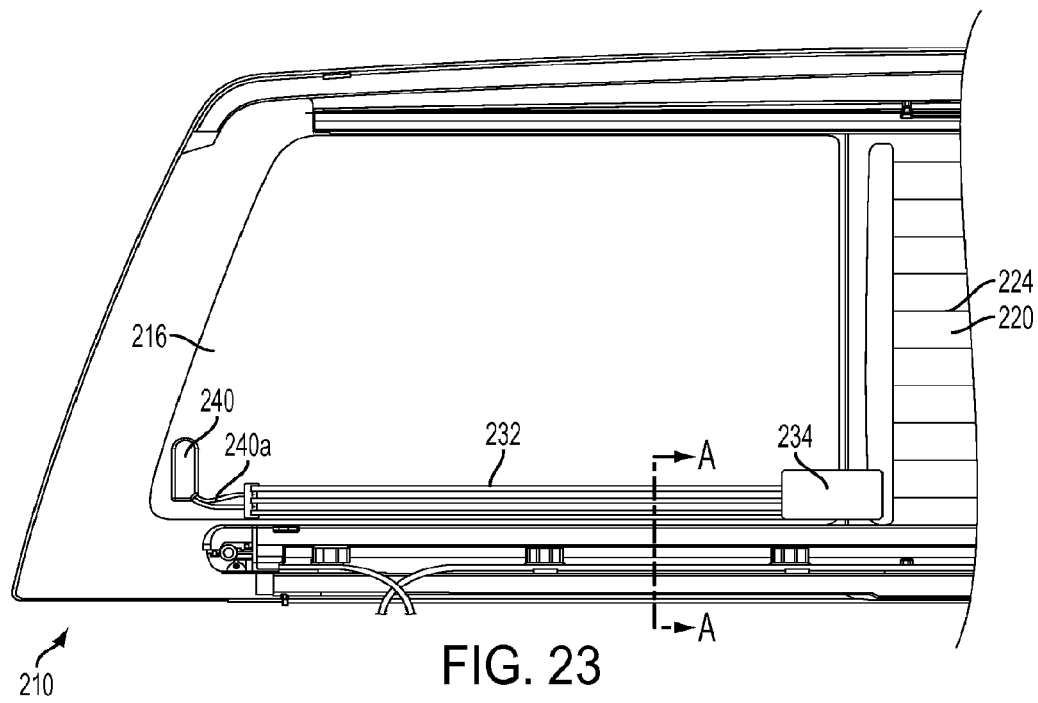
FIG. 23 is an enlarged rear elevation of one side portion of the rear slider window assembly of FIG. 22.
Figure 24:
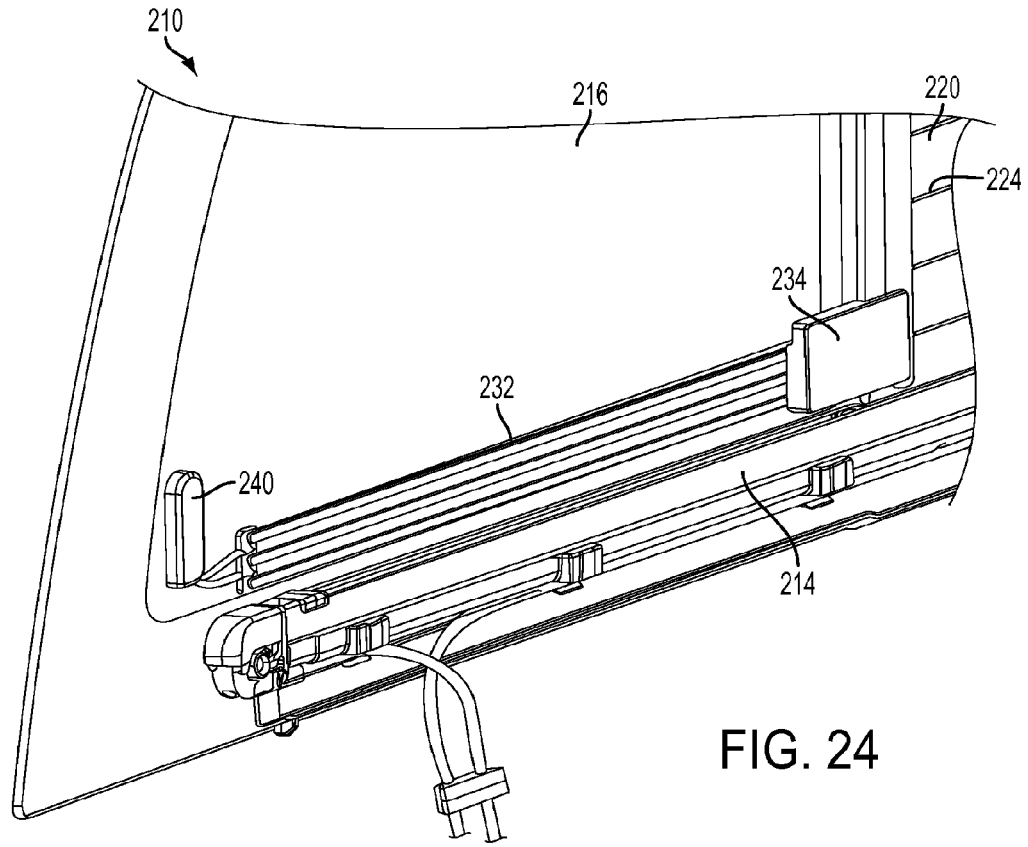
FIG. 24 is a perspective view of a lower portion of the side portion of the rear slider window assembly of FIG. 23.
Figure 23A:
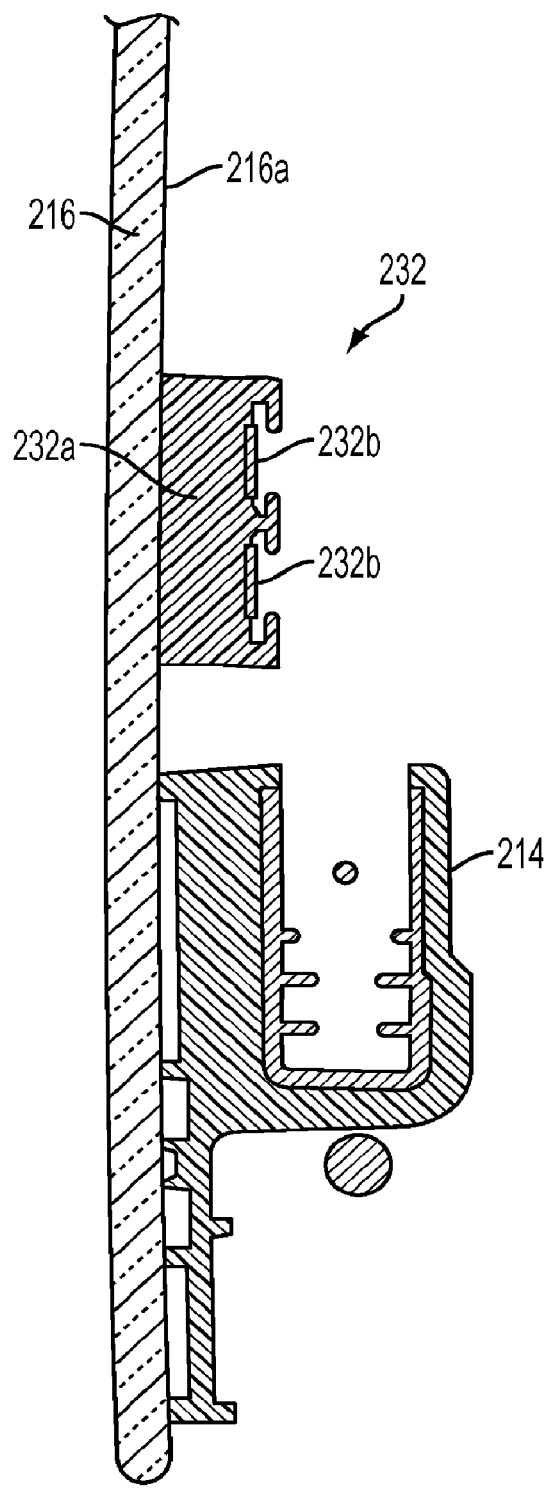
FIG. 23A is a sectional view of the rear slider window assembly taken along the line A-A in FIG. 23.
Figure 25:
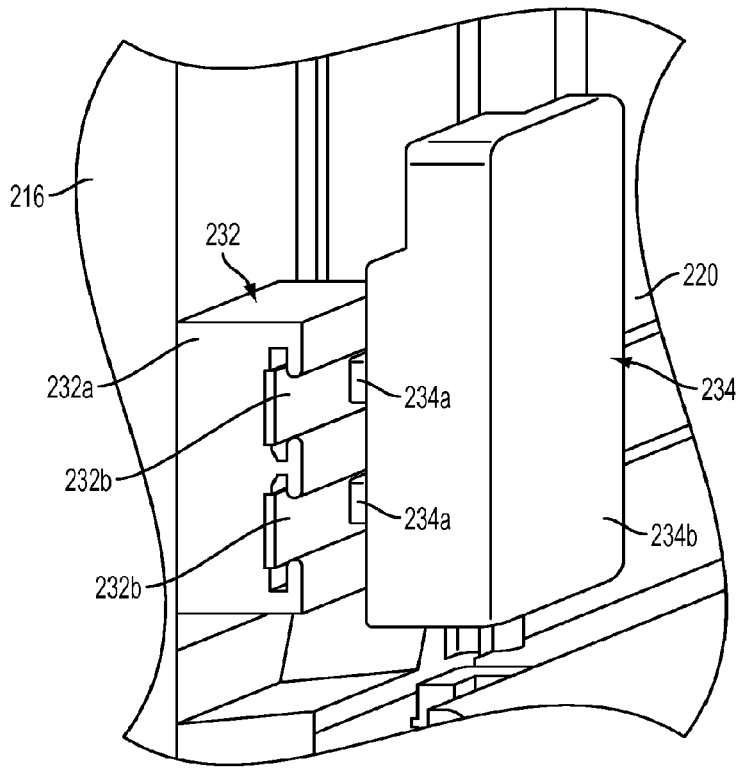
FIG. 25 is an enlarged perspective and partial sectional view of the electrical connection at the movable window panel of the rear slider window assembly of FIG. 22.

In the illustrated embodiment (and as best seen in FIGS. 23A and 25), the conductive raceway element 232 comprises a base portion 232a attached to the fixed window panel 216 (such as via adhesive bonding of the base portion to a surface 216a of the fixed window panel 216), with a pair of metallic (or otherwise electrically conductive) raceways or strips 232b extending along the base portion 232a. As shown in FIGS. 22-24, the raceways or strips 232b are electrically conductively connected to the vehicle power source (such as to respective conductive coatings or terminals at the fixed window panel 216) via an electrically conductive wire 240a and electrical connector 240, which may be attached at the fixed window panel to establish conductive continuity between the wire 240a and the vehicle power source or conductive coatings or terminals at the fixed window. Although shown as a separate connector connected to the raceway element via wire 240a, clearly other means for establishing electrical conductive continuity between the raceway element and the coatings or terminals at the fixed window panel may be implemented. For example, the electrical connector portion may be integrally formed at the end of (or elsewhere along) the raceway element and may be electrically conductively connected to (such as via soldering or the like) respective traces or terminals at the fixed window panel and/or frame portion of the window assembly.

In the illustrated embodiment, the pair of strips or raceways 232b of the raceway element 232 are spaced apart and the base portion 232b of the raceway element 232 may partially encompass or cover the raceways and may include a divider or spacer to limit or substantially preclude short circuiting between the raceways. Optionally, and desirably, the raceway element 232 may include a cover or seal (such as a cover element with an opening to allow for insertion of the electrical contacts 234a of connector 234 therethrough, such as a flexible membrane type cover with a slit established along each of the raceways of the raceway element) or the like over the strips to limit water intrusion and to limit touching of the raceways by a person's fingers or the like. The raceways or strips are partially exposed to facilitate electrically conductive contact by respective contacts 234a of electrical connector 234 of movable window panel 220 at the raceways 232a as the movable window panel is positioned or moved at or between its opened and closed positions.

Figure 26:
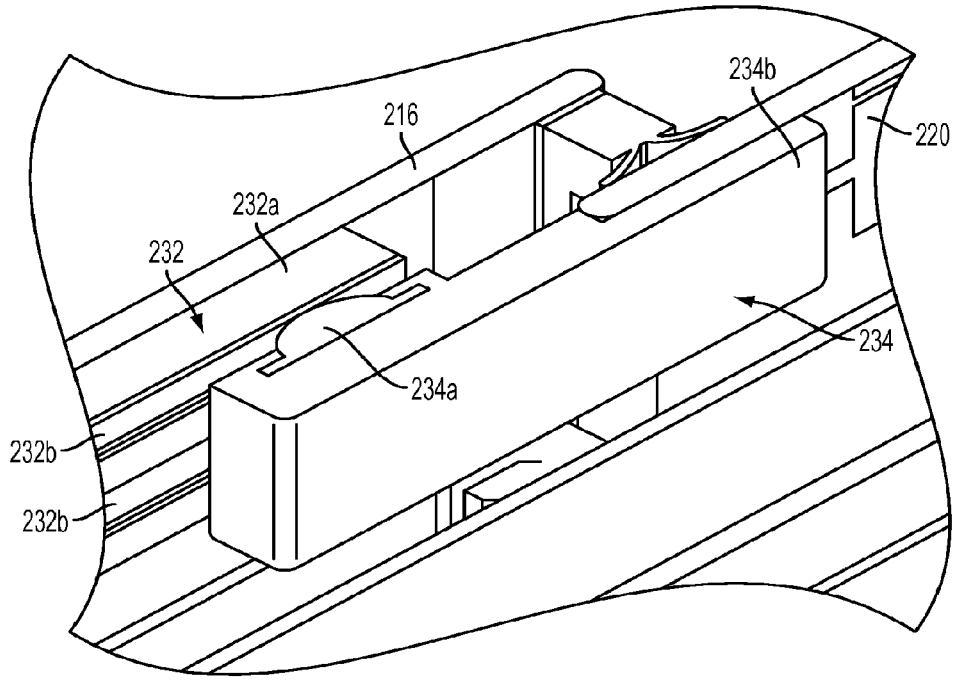
FIG. 26 is an enlarged perspective and partial sectional view of the electrical connection at the movable window panel of the rear slider window assembly of FIG. 22.
Figure 27:
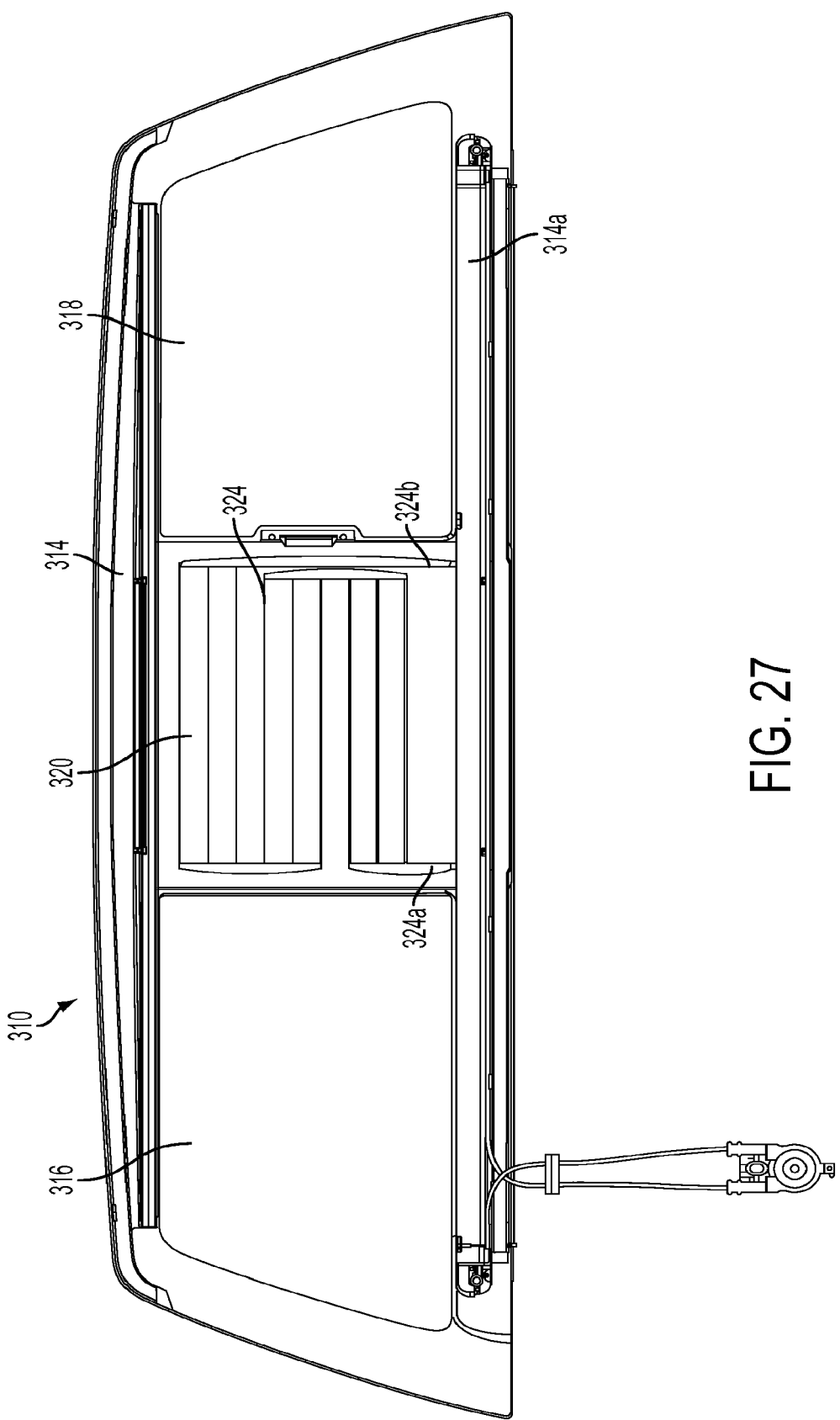
FIG. 27 is a rear elevation of another rear slider window assembly in accordance with the present invention, with an electrically conductive raceway established along the lower channel of the rear slider window assembly.
Figure 29:
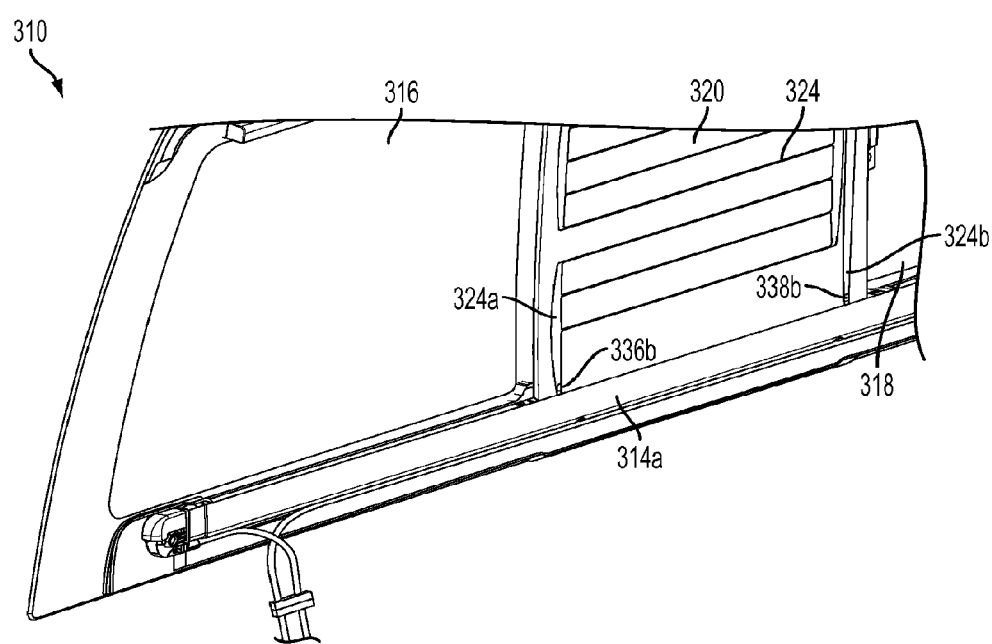
FIG. 29 is a perspective view of a lower portion of the side portion of the rear slider window assembly of FIG. 28.

In the illustrated embodiment, electrical connector 234 is attached at the movable window panel 220 and includes a pair of electrical contacts 234a that extend from the connector body 234b to contact the respective raceways 232a at the fixed window panel 216. As can be seen in FIGS. 25 and 26, the electrical contacts 234a may be received within openings or slots formed along the base portion or housing 232b of the raceway element 232 and may slidingly engage the respective raceways 232a to establish electrical conductive continuity between the connector 234 and the raceways 232a. The connector includes electrically conductive elements that electrically conductively connect between the respective contacts 234a and the respective conductive traces or busbars established at the movable window panel for powering the heater grid of the movable window panel.

Thus, electrical conductive continuity is established and maintained between the electrical connector 240 at the fixed window panel 216 and the heater grid 224 at the movable window panel 220 throughout the range of motion of the movable window panel between its opened and closed positions. The contacts 234a of the movable window panel slidingly engage the conductive raceways 232a at the fixed window panel as the movable window panel is moved between its opened and closed position. Optionally, other movable contacting means may be implemented, such as electrically conductive spring shoes or flexible contacts or rollers or other conductive elements or means or the like, that may establish and maintain electrical conductive continuity between the electrical connector at or near the fixed window panel and the heater grid at the movable window panel. Optionally, the conductive raceways may be established along the upper perimeter region of the fixed window panel and the electrical contacts may be disposed at the upper perimeter region of the movable window panel, while remaining within the spirit and scope of the present invention. Optionally, electrically conductive raceways may be established along the upper or lower perimeter region of the movable window panel, with electrical contacts disposed at the window frame or fixed window panel and in electrical conductive continuity with an electrical connector at the fixed window panel (or otherwise electrically conductively connected to the vehicle power switch or wiring harness) to establish and maintain electrical conductive continuity between the electrical connector at or near the fixed window panel and the heater grid at the movable window panel.

Optionally, the carrier of movable window panel may be electrically conductively connected to the heater grid of the movable window panel and may electrically conductively connect to the frame portion or lower channel or rail of the frame portion while the movable window panel is moved between its opened and closed positions. For example, and with reference to FIGS. 27-33, a rear slider window assembly 310 of a vehicle (such as a pickup truck or the like) includes a window frame 314, a pair of side fixed window panels 316, 318 and a movable window panel 320 that is movable relative to frame 314 and fixed window panels 316, 318 between an opened position and a closed position. Fixed window panels 316, 318 may each include an electrically conductive heater grid or other heating element or electrically operable element (not shown in FIGS. 27-33) established on a surface of the window panels (such as at or on an interior surface of the window panels) and movable window panel 320 includes an electrically conductive heater grid 324 or other heating element or electrically operable element established on a surface of the window panel (such as at or on an interior surface of the movable window panel).

In the illustrated embodiment, electrical connection between the heater grid 324 of the movable window panel and the power source or wiring harness of the vehicle is established via electrically conductive raceways or elements 332a, 332b (FIGS. 28A and 32) that extend along the lower channel 314a of the frame portion 314 that movably receives the carrier 321 of movable window panel 320. Electrical contacts 334a, 334b, which are electrically conductively connected to respective traces or busbars 324a, 324b of heater grid 324, slidingly engage (or otherwise movably engage, such as via rolling contact or the like) and establish electrically conductive continuity to the raceways 332a, 332b of the lower channel 314a, as the movable window panel and carrier move along the frame portion between opened and closed positions. The raceways 332a, 332b of lower channel 314a are electrically conductively connected to the power source of the vehicle, such as via electrical conductive connection with a wiring harness of the vehicle or a heater grid or the like of the fixed window panel, while the electrical contacts 334a, 334b of carrier 321 are electrically conductively connected to respective busbars or traces 324a, 324b of heater grid 324 of movable window panel 320, whereby the heater grid 324 is electrically conductively connected to the electrically conductive raceways 332a, 332b (such as via sliding or rolling engagement with the raceway) irrespective of the position of the movable window panel and as the movable window is moved between its closed position and its opened position.

Figure 28:
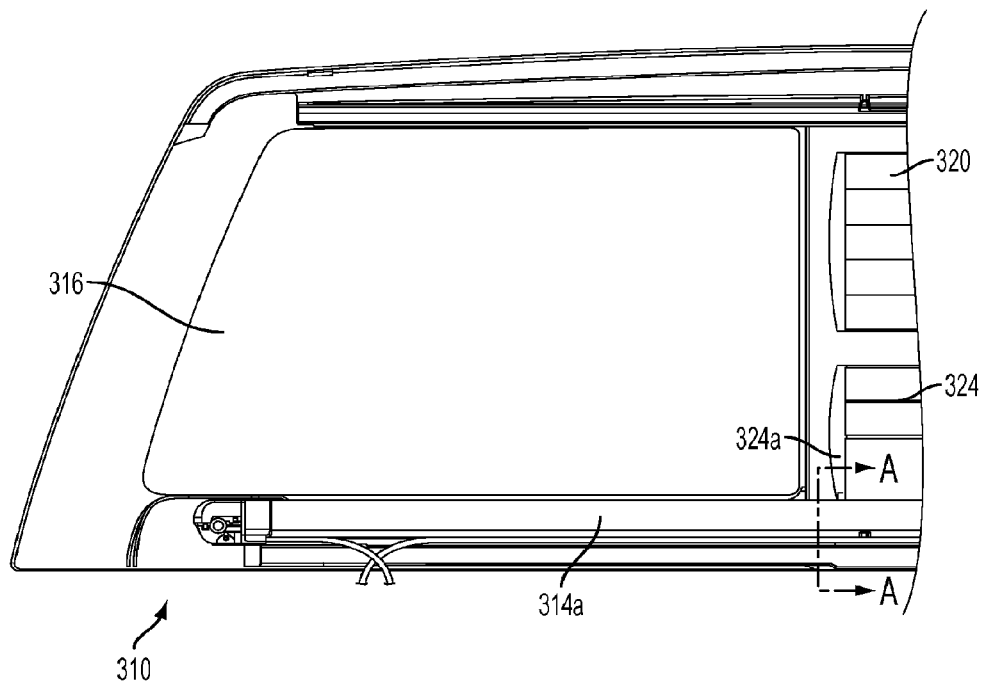
FIG. 28 is an enlarged rear elevation of one side portion of the rear slider window assembly of FIG. 27.
Figure 28A:
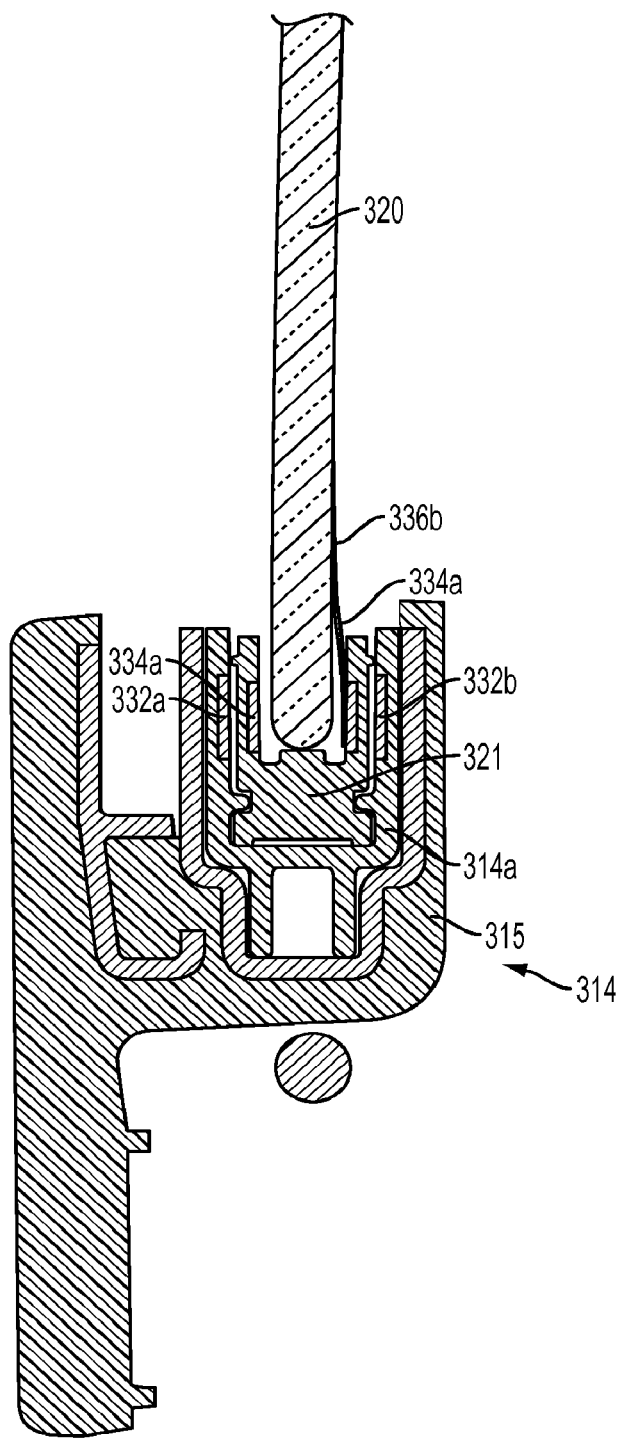
FIG. 28A is a sectional view of the rear slider window assembly taken along the line A-A in FIG. 28.
Figure 30:
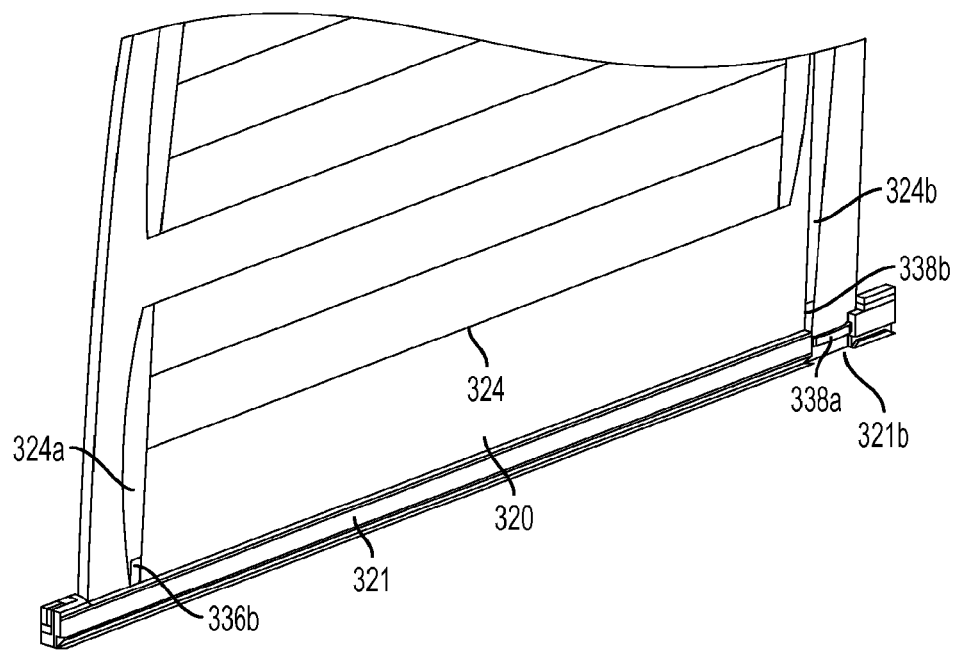
FIG. 30 is a perspective view of the lower portion of the movable window panel of the rear slider window assembly of FIG. 27.
Figure 31:
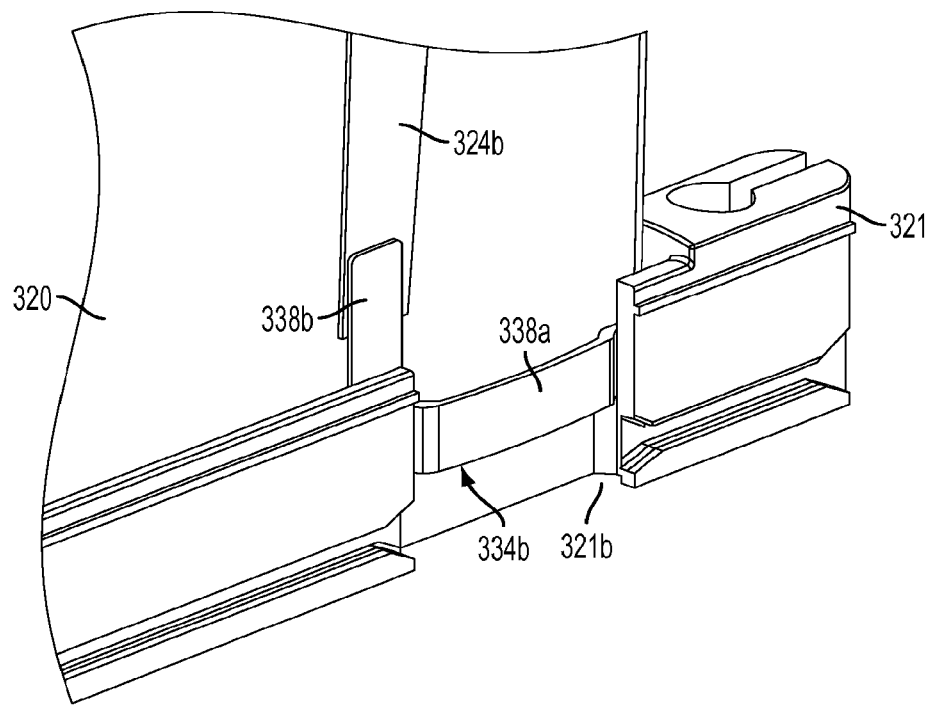
FIG. 31 is an enlarged perspective view of the electrical connector at the movable window panel of the rear slider window assembly of FIG. 27.
Figure 32:
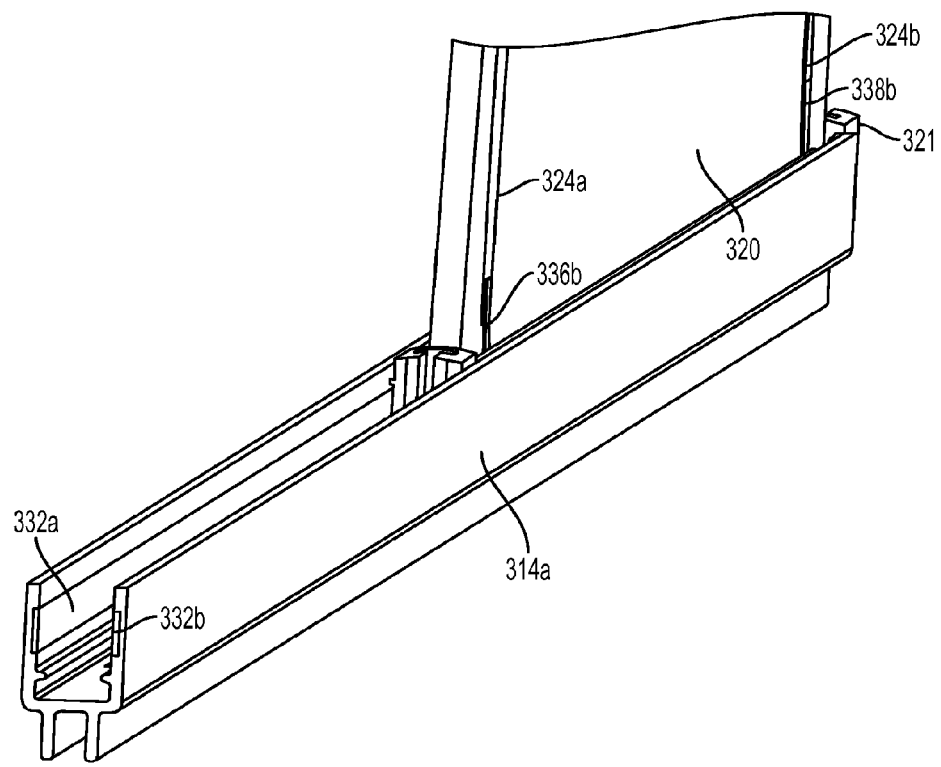
FIG. 32 is a perspective view of the lower channel and movable window panel of the rear slider window assembly of FIG. 27.
Figure 33:
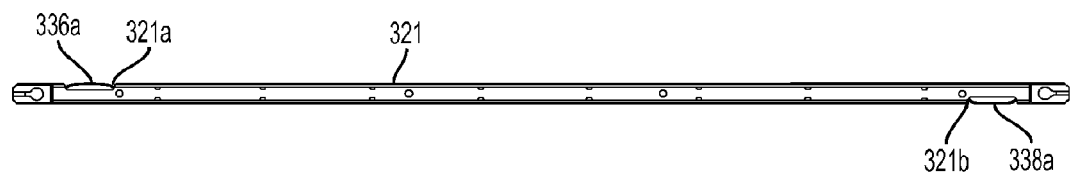
FIG. 33 is a plan view of the carrier for the movable window panel of the rear slider window assembly of FIG. 27.
Figure 34:
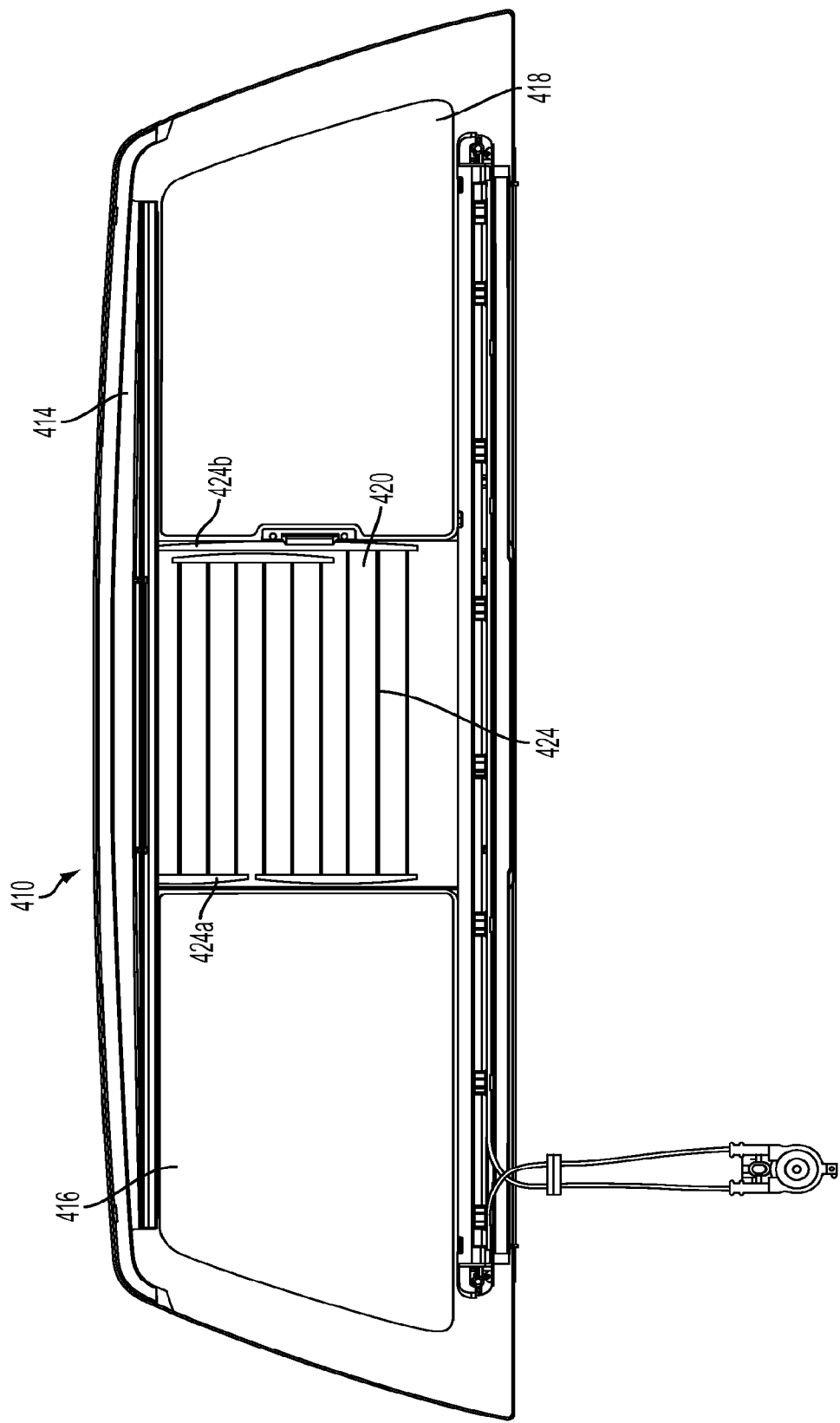
FIG. 34 is a rear elevation of another rear slider window assembly in accordance with the present invention, with an electrically conductive raceway established along the upper channel of the rear slider window assembly.
Figure 36:
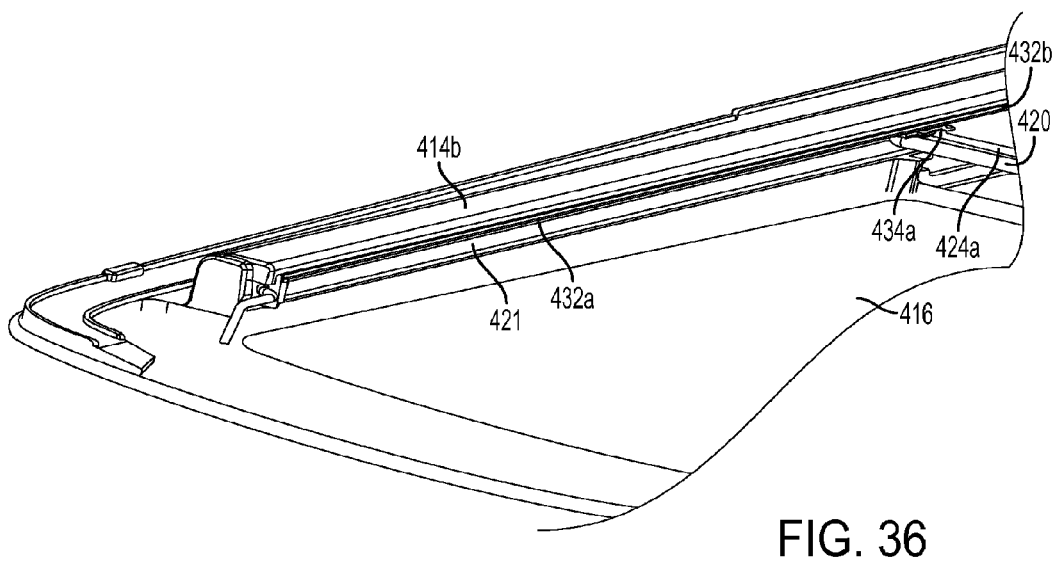
FIG. 36 is a perspective view of a lower portion of the side portion of the rear slider window assembly of FIG. 35.

In the illustrated embodiment, and as best shown in FIGS. 28A and 32, electrically conductive elements or raceways 332a, 332b are disposed at and partially in opposite side walls of lower channel portion 314a (such as in and along respective channels or grooves established in the side walls). Lower channel portion 314a is received in a lower channel frame portion 315 of frame portion 314 and is formed or shaped to receive the carrier 321 therein, whereby carrier 321 may move along channel portion 314a as the movable window panel 320 is moved between its opened and closed positions. The electrically conductive raceways or strips 332a, 332b extend along lower channel portion so that electrical conductive continuity may be established between the raceways 332a, 332b and the electrical contacts 334a, 334b of carrier 321 irrespective of the position of movable window panel 320 relative to fixed window panels 316, 318 and frame portion 314.

Carrier 321 is formed to receive a lower perimeter edge region of movable window panel 320 and to movably support the movable window panel at and along lower channel portion 314a. As best shown in FIGS. 28A, 30, 31 and 33, carrier 321 includes electrical contact 334a at one end of carrier 321 and electrical contact 334b at the opposite end of carrier 321. In the illustrated embodiment, electrical contact 334a has a contacting portion 336a at one side of the carrier 321 that protrudes at least partially from carrier 321 (such as at a cutaway portion or opening 321a of carrier 321) for contacting raceway element 332a of lower channel portion 314a when carrier 321 is received in lower channel portion 314a. Electrical contact 334a includes a wraparound portion (not shown) that wraps around the perimeter end of movable window panel 320 (or that otherwise established electrical conductive continuity between the opposite sides of the carrier and movable window panel) and that includes or is electrically conductively connected with a tab or portion 336b that extends upward from carrier 321 and that contacts electrically conductive trace or busbar 324a of heater grid 324 of movable window 320.

Likewise, electrical contact 334b has a contacting portion 338a at the side of the carrier 321 (such as the side of the carrier that corresponds with the side of the movable window panel 320 that has the heater grid or terminal or busbar established thereat) that protrudes at least partially from carrier 321 (such as at a cutaway portion or opening 321b of carrier 321) for contacting raceway element 332b of lower channel portion 314a when carrier 321 is received in lower channel portion 314a. Electrical contact 334b includes a tab or portion 338b that extends upward from carrier 321 and that contacts electrically conductive trace or busbar 324b of heater grid 324 of movable window 320. The tabs or portions 336b, 338b of contacts 334a, 334b may be electrically conductively connected to the busbars 324a, 324b of heater grid 324 via any suitable means, such as via soldering or the like.

In the illustrated embodiment, the contacting portions 336a, 338a comprise flexible metallic strips that protrude partially outwardly from carrier 321 and that may flex or compress when they contact raceway elements 332a, 332b of lower channel portion 314a so as to establish electrically conductive continuity between the contacting portions 336a, 336b and the raceway elements 332a, 332b as the movable window panel 320 is moved along lower channel portion 314a between its opened and closed positions. The contacting portions of the electrical contacts may comprise any suitable contacting means, such as flexible or compressible metallic or otherwise electrically conductive contacting elements (such as shown in the illustrated embodiment) or roller elements or brushes or the like, that contact the raceway elements of the lower channel portion and establish and maintain electrical conductive continuity between the electrical contacts and the raceway elements throughout the range of movement of the movable window panel between its opened and closed positions, while remaining within the spirit and scope of the present invention. Also, in the illustrated embodiment, the raceway elements 332a, 332b are established along opposite side walls of the lower channel potion 314a, such that one of the electrical contacts 334a wraps around the movable window panel so as to establish electrical conductive continuity between the opposite sides of the carrier and movable window panel. However, it is envisioned that the raceway elements may be established or disposed along the same side wall of the lower channel portion (such as one raceway element disposed above and spaced from the other raceway element), whereby the electrical contacts may comprise contacting portions disposed at the same side of the carrier and spaced from one another in a similar manner, while remaining within the spirit and scope of the present invention.

Although shown and described as being disposed along lower portions of the movable window panel and frame portion, electrically conductive contacts and raceway elements may be similarly established along an upper carrier and upper frame portion of a window assembly, while remaining within the spirit and scope of the present invention. Optionally, for example, and with reference to FIGS. 34-38, a rear slider window assembly 410 of a vehicle (such as a pickup truck or the like) includes a window frame 414, a pair of side fixed window panels 416, 418 and a movable window panel 420 that is movable relative to frame 414 and fixed window panels 416, 418 between an opened position and a closed position. Fixed window panels 416, 418 may each include an electrically conductive heater grid or other heating element or electrically operable element (not shown in FIGS. 34-38) established on a surface of the window panels (such as at or on an interior surface of the window panels) and movable window panel 420 includes an electrically conductive heater grid 424 or other heating element or electrically operable element established on a surface of the window panel (such as at or on an interior surface of the movable window panel). Electrical connection between the heater grid 424 of the movable window panel 420 and the power source or wiring harness of the vehicle is established via electrically conductive raceways or elements 432a, 432b that extend along an upper filler or carrier 421 that is received in the upper channel 414b of the frame portion 414 (such as a filler element that is typically slid between the upper perimeter edge portion of the movable window panel and the upper channel portion of the frame after the movable window assembly is installed at the frame, in order to fill the gap between the movable window panel and the upper channel portion of the frame). Electrical contacts 434a, 434b, which are electrically conductively connected to respective traces or busbars 424a, 424b of heater grid 424, slidingly engage (or otherwise movably engage, such as via rolling contact or the like) and establish electrically conductive continuity to the raceways 432a, 432b of the filler 421, as the movable window panel 420 moves along the frame portion between opened and closed positions. The raceways 432a, 432b of filler 421 are electrically conductively connected to the power source of the vehicle, such as via electrically conductive connection with a wiring harness of the vehicle or a heater grid or the like of the fixed window panel, while the electrical contacts 434a, 434b of movable window panel 420 are electrically conductively connected to respective busbars or traces 424a, 424b of heater grid 424 of movable window panel 420 (such as via soldering or the like), whereby the heater grid 424 is electrically conductively connected to the electrically conductive raceways 432a, 432b (such as via sliding or rolling engagement with the raceway elements) irrespective of the position of the movable window panel and as the movable window is moved between its closed position and its opened position.

Figure 35:
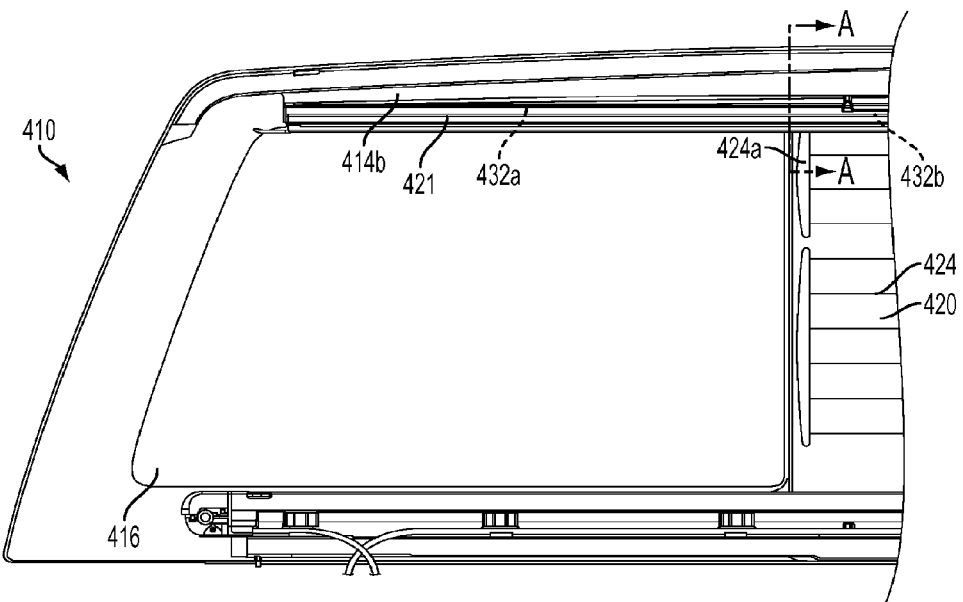
FIG. 35 is an enlarged rear elevation of one side portion of the rear slider window assembly of FIG. 34.
Figure 35A:
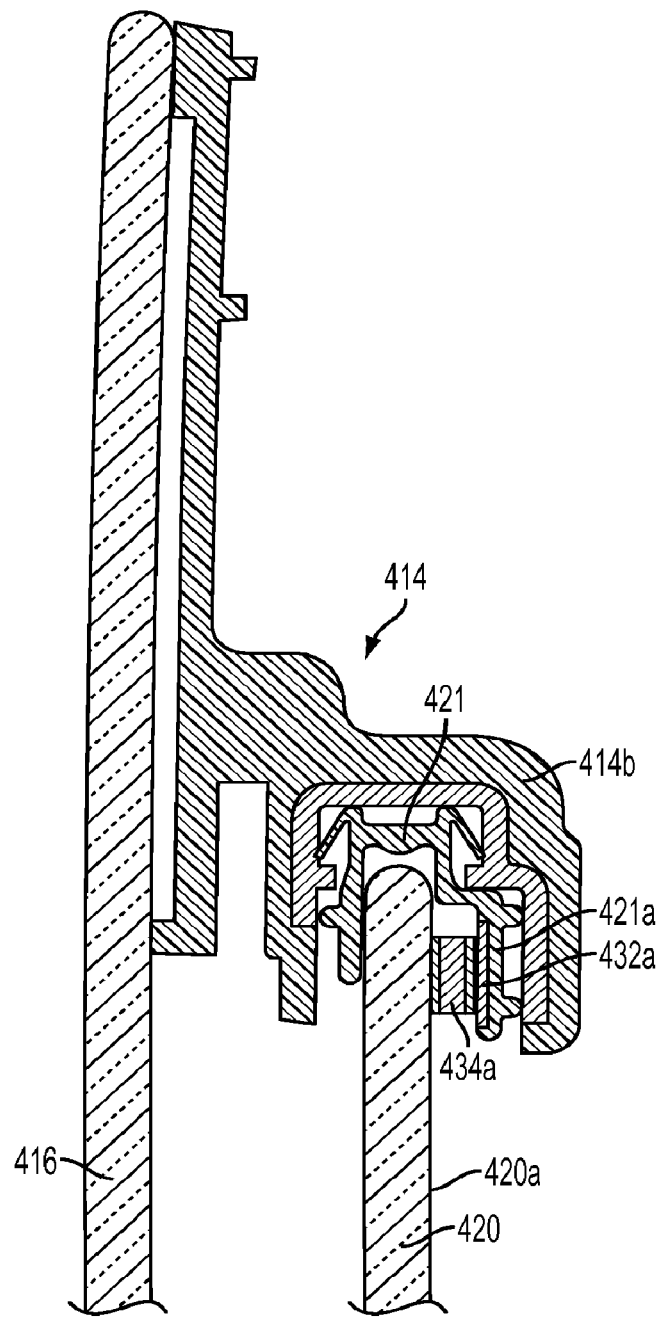
FIG. 35A is a sectional view of the rear slider window assembly taken along the line A-A in FIG. 35.
Figure 37:
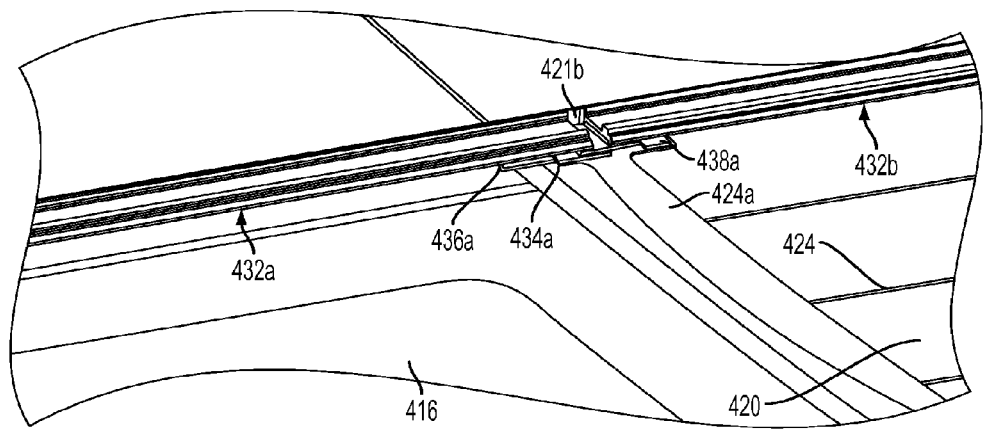
FIG. 37 is a perspective view of the upper channel and electrical connection between the movable window panel and one of the raceways of the upper channel of the rear slider window assembly of FIG. 34.

In the illustrated embodiment, and as best shown in FIGS. 35A and 37, electrically conductive elements or raceways 432a, 432b are disposed at and partially in a side wall 421a of filler 421 (such as in and along respective channels or grooves established along the side wall). Filler 421 is received in an upper channel frame portion 414b of frame portion 414 and is formed or shaped to receive the upper perimeter edge region of movable window panel 420 therein, with the side wall 421a and raceway elements 432a, 432b being spaced from the surface 420a of movable window panel 420 at which the electrical contacts 434a, 434b are disposed. Movable window panel 420 thus may move along filler 421 and channel portion 414b between its opened and closed positions. The electrically conductive raceways or strips 432a, 432b extend along respective portions of filler 421 and upper channel portion 414b. For example, one of the raceway elements or strips 432a extends along the filler 421 and channel portion 414b at and along the upper perimeter edge region of fixed window panel 416, while the other raceway element or strip 432b extends along the filler 421 and channel portion 414b at and along the upper perimeter edge of the central region above movable window panel 420 when the movable window panel is in its closed position. As shown in FIG. 37, the filler 421 may have a gap or spacing 421b established between the spaced apart conductive raceway elements 432a, 432b to limit or substantially preclude electrical conductive contact of the electrical contacts 434a, 434b of movable window panel 420 with the wrong raceway element 432a, 432b to limit or substantially preclude electrical shorting between the contacts and raceway elements.

Figure 38:
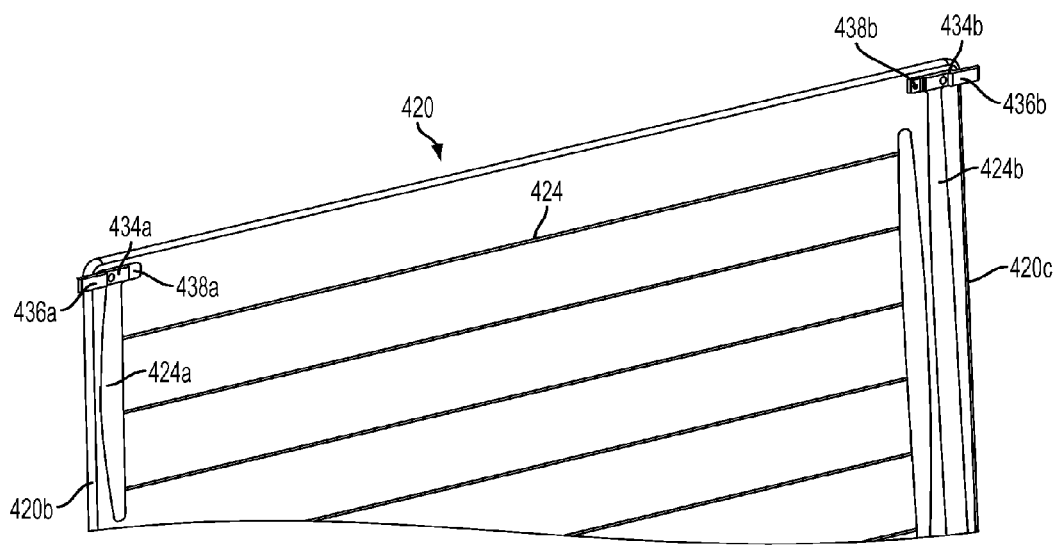
FIG. 38 is a perspective view of the upper portion of the movable window panel of the rear slider window assembly of FIG. 34.

As best shown in FIGS. 35A, 37 and 38, contact 434a is disposed at and attached at one end of movable window panel 420 and electrical contact 434b is disposed at and attached at the opposite end of movable window panel 420. In the illustrated embodiment, electrical contact 434a has a contacting portion 436a that protrudes outwardly away from an attaching portion 438a attached at surface 420a of movable window panel 420 (such as by soldering or otherwise connecting or attaching or bonding attaching portion 438a at busbar or trace 424a of heater grid 424) and laterally away from the side perimeter region 420b of the movable window panel 420. Thus, and as best shown in FIG. 37, when movable window panel 420 is closed, contacting portion 436a of electrical contact 434a spans the gap 421b of filler 421 so that contacting potion 436a contacts raceway element 432a at filler 421 that is disposed along the fixed window panel 416, and when movable window panel 420 is moved towards its opened position, contacting portion 436a maintains electrically conductive continuity between electrical contact 434a and raceway element 432a.

Likewise, electrical contact 434b is disposed at the opposite end portion or edge region 420c of movable window panel 420 and has a contacting portion 436b that protrudes outwardly away from an attaching portion 438b attached at surface 420a of movable window panel 420 (such as by soldering or otherwise connecting or attaching or bonding attaching portion 438b at busbar or trace 424b of heater grid 424) and laterally away from the side perimeter region 420c of the movable window panel 420. Thus, when movable window panel 420 is closed, contacting portion 436b of contacting potion 436b contacts raceway element 432b at filler 421 that is disposed along the central region of the filler 421 and generally along the closed position of movable window panel 420, and when movable window panel 420 is moved towards its opened position, contacting portion 436b maintains electrically conductive continuity between electrical contact 434b and raceway element 432b, and when movable window panel 420 is fully opened, contacting portion 436b of electrical contact 434b spans the gap 421b of filler 421 so that contacting potion 436b maintains contact with raceway element 432b at the central region of filler 421.

In the illustrated embodiment, the electrical contacts 434a, 434b comprise flexible metallic strips that protrude partially outwardly from surface 420a of movable window panel 420 and that may flex or compress when they contact raceway elements 432a, 432b of filler 421 so as to establish electrically conductive continuity between the contacting portions 436a, 436b and the raceway elements 432a, 432b as the movable window panel 420 is moved along filler 421 and upper channel portion 414a between its opened and closed positions. The contacting portions of the electrical contacts may comprise any suitable contacting means, such as flexible or compressible metallic or otherwise electrically conductive contacting elements (such as shown in the illustrated embodiment) or roller elements or brushes or the like, that contact the raceway elements of the filler and/or upper channel portion and establish and maintain electrical conductive continuity between the electrical contacts and the raceway elements throughout the range of movement of the movable window panel between its opened and closed positions, while remaining within the spirit and scope of the present invention.

Also, in the illustrated embodiment, the raceway elements 432a, 432b are established along the same or common side wall of the filler and upper channel potion, such that one of the electrical contacts extends from the movable window panel in one direction and the other of the electrical contacts may extend from the movable window panel in the opposite direction. However, it is envisioned that the raceway elements may be established or disposed along opposite side walls of the filler and/or upper channel portion, whereby the electrical contacts may comprise contacting portions disposed at opposite sides of the movable window panel (with one of the contacts either wrapping around the perimeter edge of the movable window panel or having conductive continuity otherwise established between the opposite sides or surfaces of the movable window panel (such as via an electrically conductive coating or trace or busbar being established around the edge dimension of the movable window panel, such as by utilizing aspects of the mirror assemblies described in U.S. Pat. Nos. 7,626,749; 7,400,435; 7,184,190 and/or 7,255,451, and/or U.S. patent application Ser. No. 11/226,628, filed Sep. 14, 2005, published Mar. 23, 2006 as U.S. Publication No. 2006-0061008, now abandoned; and/or PCT Application No. PCT/US2007/082099, filed Oct. 22, 2007 and published May 2, 2008 as International Publication No. WO 2008/051910, which are hereby incorporated herein by reference in their entireties, or via an electrically conductive coating or trace or busbar being established through the movable window panel, such as by utilizing aspects of the touch sensors described in U.S. patent application Ser. No. 12/513,960, filed May 7, 2009, published Dec. 31, 2009 as U.S. Publication No. 2009-0322705, now abandoned, which is hereby incorporated herein by reference in its entirety), while remaining within the spirit and scope of the present invention.

Figure 39:
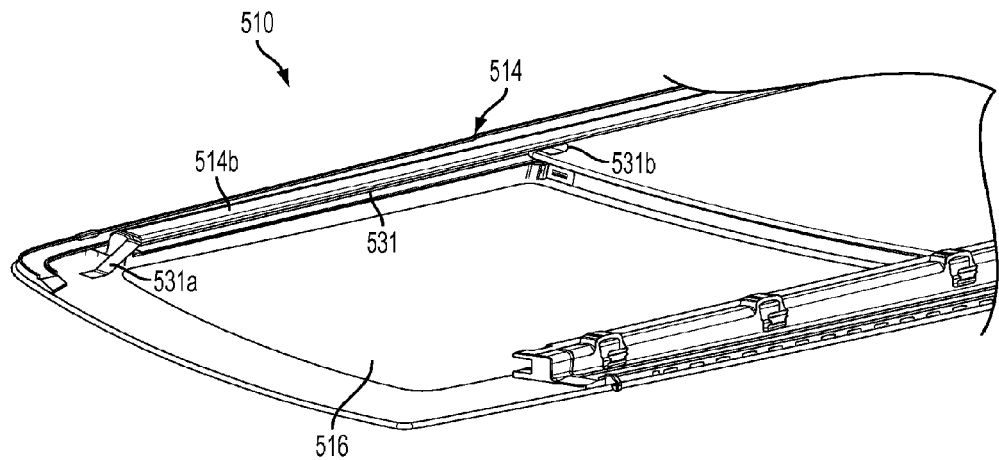
FIG. 39 is a perspective view of an upper portion of another rear slider window assembly in accordance with the present invention, shown with the movable window panel in its closed position.
Figure 40:
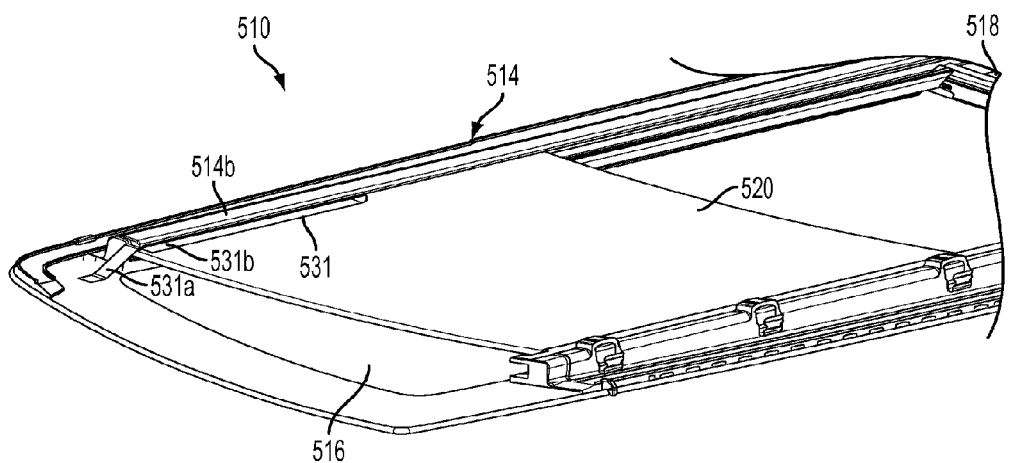
FIG. 40 is another perspective view of the upper portion of the rear slider window assembly of FIG. 39, shown with the movable window panel in its opened position.

Optionally, the electrically conductive connection between the fixed window panel or frame and the movable window panel may be established and maintained via other suitable means, such as via other types or forms of electrically conductive wiring or cables or via other movable contacts or the like. Optionally, the electrical contacts may be provided via other suitable means and may be provided along the upper rail of the window assembly, such as via a flexible wire or ribbon cable disposed at the upper rail of the window assembly. For example, and with reference to FIGS. 39 and 40, a rear slider window assembly 510 of a vehicle (such as a pickup truck or the like) includes a window frame 514, a pair of side fixed window panels 516, 518 and a movable window panel 520 that is movable relative to frame 514 and fixed window panels 516, 518 between a closed position (FIG. 39) and an opened position (FIG. 40). Fixed window panels 516, 518 may each include an electrically conductive heater grid or other heating element or electrically operable element (not shown in FIGS. 39 and 40) established on a surface of the window panels (such as at or on an interior surface of the window panels) and movable window panel 520 includes an electrically operated element, such as an electrically conductive heater grid (not shown in FIGS. 39 and 40) or other heating element or electrically operable element, established on a surface of the window panel (such as at or on an interior surface of the movable window panel).

In the illustrated embodiment, electrical connection between the heater grid or electrically operable element of the movable window panel 520 and the power source or wiring harness of the vehicle is established via a flexible electrically conductive wire or ribbon cable 531 that is electrically connected at one end 531*a* to electrically powered terminals 532 at the frame 514 or fixed window panel 516, and at the other end 531*b* to electrically conductive contacts that are electrically conductively connected to respective traces or busbars of the heater grid of the movable window panel 520. Optionally, the end 531*b* of the flexible cable 531 may connect to a jumper element (such as a metallic or polymeric non-flexible element with electrically conductive traces or elements disposed therealong), which extends from the upper rail or frame portion to the surface of the fixed window panel, such as at or near the perimeter region of the fixed window panel and where an opaque layer or coating (such as a ceramic frit layer or the like) may be established at the surface of the fixed window panel. The flexible wire or ribbon cable 531 flexes and folds over on itself or overlays itself in a controlled manner (along the upper rail or frame portion 514*b*) as the movable window panel 520 moves along the frame portion between opened and closed positions. The flexible wire or ribbon cable may comprise any suitable wire or cable, and may comprise a pair of electrically conductive wires arranged in a generally flat or planar elongated strip, whereby the strip may be flexible in one direction (such as upward and/or downward in FIGS. 39 and 40), while resisting flexing in other directions (such as forward and/or rearward in FIGS. 39 and 40 and relative to the vehicle direction of travel).

The electrically powered terminals at the frame 514 or fixed window panel 516 (to which the ends 531*a* of wire or cable 531 are electrically connected, such as via soldering or the like) are electrically conductively connected to the power source of the vehicle, such as via electrically conductive connection with a wiring harness of the vehicle or a heater grid or the like of the fixed window panel (which in turn is electrically conductively connected to the vehicle wire harness or the like), while the end 531*b* of electrical wiring or cable 531 is electrically conductively connected to respective busbars or traces of the heater grid of movable window panel 520 (such as via soldering or the like). Thus, the heater grid of movable window panel 520 is electrically conductively connected to the electrically conductive terminals 532 (such as via continuous connection via wire or cable 531 and via flexing or bending of wire or cable 531) irrespective of the position of the movable window panel and as the movable window is moved between its closed position and its opened position.

Optionally, other means for establishing and maintaining electrical connection to the heater grid of the movable window panel throughout the range of motion of the movable window panel may be implemented while remaining within the spirit and scope of the present invention. Although shown and described as a rear slider window assembly having a pair of side fixed window panels and a single horizontally movable window panel, other slider window configurations may be implemented while remaining within the spirit and scope of the present invention. For example, a window assembly may have a single fixed window panel with one or more movable window panels that is/are movable relative to the fixed window panel between opened and closed positions while the heater grid of the movable window panel/panels remain electrically conductively connected to a power source so that the heater grid/grids may be powered irrespective of whether the movable window/windows is/are opened or closed. Optionally, it is envisioned that aspects of the present invention may be suitable for a vertically movable window panel that has one or more movable window panels that is/are vertically movable relative to one or more fixed window panels of the window assembly.

Optionally, the heater grids of the fixed window panels may be electrically conductively connected via one or more jumper wires or cables or elements that extend between the fixed window panels and that are electrically connected to respective portions of the heater grids. For example, and with reference to FIGS. 41-43, a rear slider window assembly 610 of a vehicle (such as a pickup truck or the like) includes a window frame 614, a pair of side fixed window panels 616, 618 and a movable window panel 620 that is movable relative to frame 614 and fixed window panels 616, 618 between an opened position and a closed position. Fixed window panels 616, 618 each include an electrically conductive heater grid or other heating element or electrically operable element 622, 623 established on a surface of the window panels (such as at or on an interior surface of the window panels) and movable window panel 620 includes an electrically conductive heater grid 624 or other heating element or electrically operable element established on a surface of the window panel (such as at or on an interior surface of the movable window panel). In the illustrated embodiment, electrical connection between the heater grid 624 of the movable window panel and the power source of the vehicle is established via an extendable and retractable flexible cable or wire 632 that is wound around and/or retracted in a spool device 633 and that is extendable from or unwound from the spool device as the movable window is moved towards its closed position and is retractable into or wound onto/into the spool device as the movable window is moved towards its opened position, such as in a similar manner as described above with respect to window assembly 110.

The heater grids 622, 623 of the fixed window panels 616, 618 are electrically conductively connected to (or are otherwise in electrical conductive continuity with) a power source of the vehicle and may be powered (such as responsive to a user actuatable input or switch or button of the vehicle) to heat or defrost or defog the fixed window panels 616, 618, while the heater grid 624 of movable window panel 620 is electrically connected to the power source via electrical connection to electrical terminals or elements at one of the heater grids of the fixed window panels (such as via flexible cable 632), and may be electrically powered to heat or defrost or defog the movable window panel 620 in a manner that allows for heating or defogging or defrosting of the movable window panel irrespective of whether the movable window panel is opened or partially opened or closed, such as in a similar mariner as discussed above.

Figure 41:
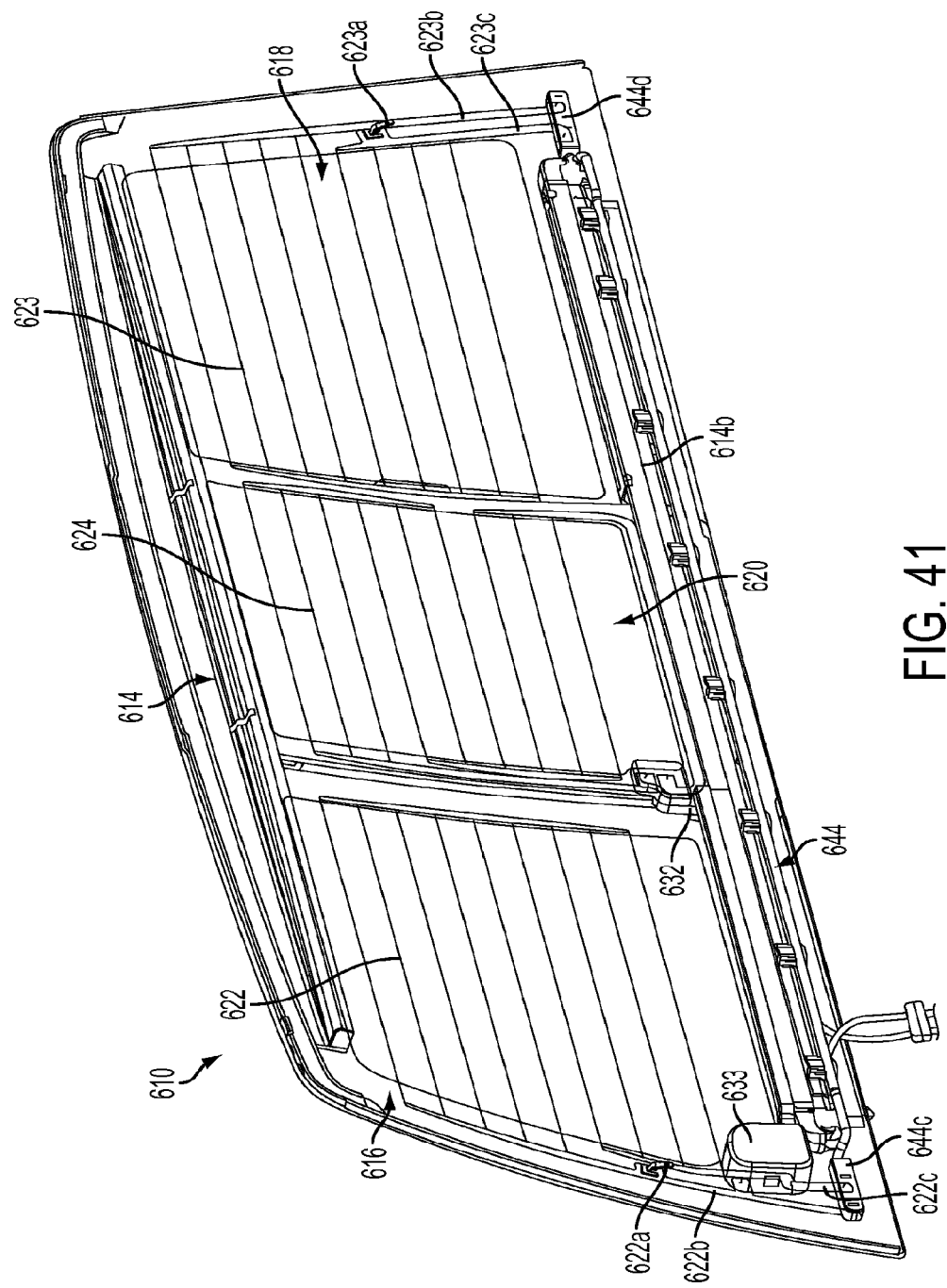
FIG. 41 is a perspective view of another rear slider window assembly in accordance with the present invention, with an electrically conductive jumper connector or wire established across the rear slider window assembly to electrically connect to the positive and negative terminals of the fixed glass panels.
Figure 42:
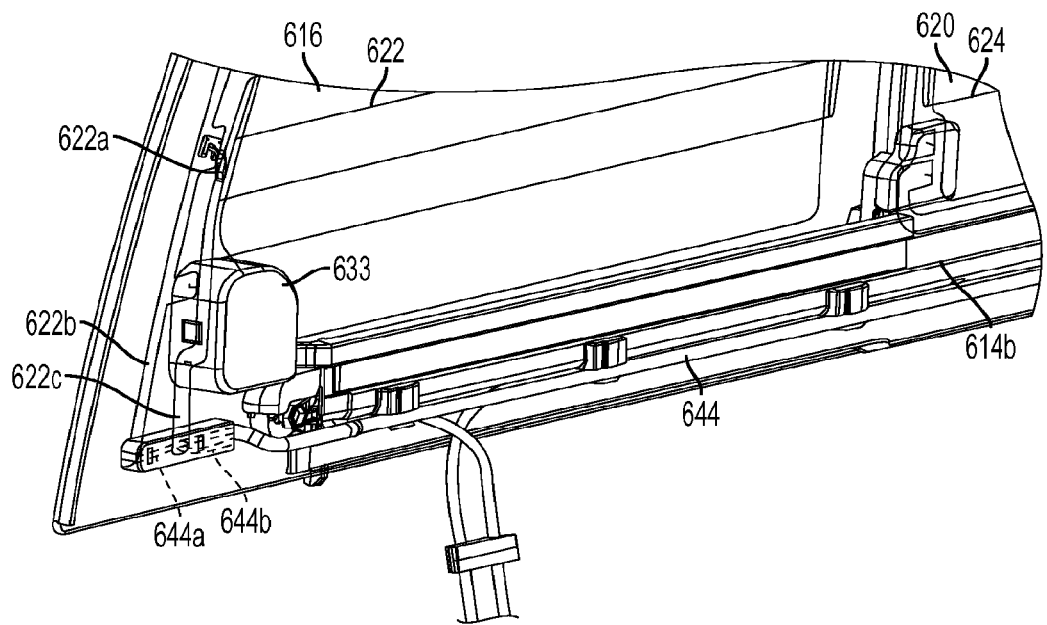
FIG. 42 is a perspective view of a lower portion of the rear slider window assembly of FIG. 41.
Figure 43:
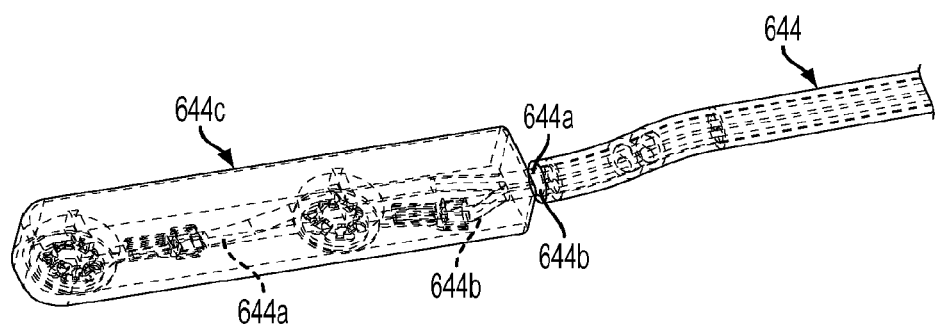
FIG. 43 is a perspective view of an electrical connector suitable for use with the rear slider window assembly of FIG. 41.

In the illustrated embodiment, heater grid 622 of fixed window panel 616 includes a terminal or electrical connector 622a for connecting to a power feed (such as a positive or negative feed) of the vehicle, while heater grid 623 of fixed window panel 618 includes a terminal or electrical connector 623a for connecting to another power feed (such as a negative or positive feed) of the vehicle, with the terminals 622a, 623a being disposed at or near opposite sides of the window assembly. Such an electrical connection to the vehicle power source may occur for applications where the vehicle may optionally have either a conventional fixed window without a center slider panel of a rear slider window assembly such as shown in FIGS. 41-43. Window assembly 610 includes a jumper wire or cable or element 644 that established electrically conductive connection between the heater grids 622, 623 of fixed window panels 616, 618.

In the illustrated embodiment, jumper element 644 comprises a pair of wires 644a, 644b connected between opposite end connectors 644c, 644d. Jumper element 644 extends along a lower channel 614b of frame 614, with connector 644c attached or disposed at fixed window panel 616 and connector 614d attached or disposed at fixed window panel 618. As can be seen in FIGS. 41-43, an end of one of the wires 644a at connector 644c may be electrically connected to an electrically conductive trace or terminal 622b of heater grid 622 (that may extend from or be near to terminal 622a for connecting to the vehicle wiring harness when the window assembly is installed at a vehicle), while an end of the other wire 644b at connector 644c may be electrically connected to an electrically conductive trace or terminal 622c of heater grid (that is at an opposite end of the heater grid or trace from the terminal 622a). Likewise, the opposite end of wire 644b at connector 644d is electrically connected to an electrically conductive trace or terminal 623c of heater grid 623 (that may extend from or be near to terminal 623a for connecting to the vehicle wiring harness when the window assembly is installed at a vehicle), while the opposite end of the other wire 644a at connector 644d may be electrically connected to an electrically conductive trace or terminal 623b of heater grid (that is at an opposite end of the heater grid or trace from the terminal 623a).

Thus, the jumper wire or element 644 provides electrical connection between a terminal at one of the fixed window panels (such as, for example, a positive terminal 622a at fixed window panel 616) and a terminal at the other of the fixed window panels (such as, for example, a negative terminal 623a at fixed window panel 618). Thus, each heater grid 622, 624 of fixed window panels 616, 618 are powered by electrical connection of a positive feed at a terminal on one side of the window assembly and a negative feed at a terminal on the other side of the window assembly. The rear slider window assembly thus may be mounted at a vehicle that has an electrical connection at opposite sides of the window assembly, such as may be provided for a single fixed panel window assembly.

Although shown and described as having a positive terminal at one fixed panel and a negative terminal at the other fixed panel and a jumper wire connecting between the heater grids of the fixed panels, it is envisioned that a jumper wire may be provided between heater grids of a window assembly that has both the positive and negative terminals established at one of the fixed window panels, with the jumper wire establishing electrically conductive connection or continuity between the heater grid with the terminals and the heater grid of the other fixed window panel (via electrically connecting to respective traces at the other fixed window panel), while remaining within the spirit and scope of the present invention. Likewise, although shown and described as having the jumper wire extend along the lower channel of the window assembly, clearly the jumper wire or element may be established at and along the upper channel of the window assembly or may be established in and along the upper or lower channel, or one wire or element may be established at or in and along the upper channel and another wire or element may be established at or in and along the lower channel, while remaining within the spirit and scope of the present invention. Although shown and described as having a flexible wire 632 and spool 633 for establishing electrical connection between the heater grid 624 of the movable window panel and the power source of the vehicle, it is envisioned that window assembly 610 may include any other suitable means for establishing electrical connection between the heater grid 624 of the movable window panel and the power source of the vehicle in a manner that allows for heating or defogging or defrosting of the movable window panel (or otherwise provides electrical power to an electrical element of the movable window panel) irrespective of whether the movable window panel is opened or partially opened or closed, such as via any of the optional means described herein.

Thus, and in accordance with the present invention, electrical conductive continuity and hence heating via the electrically conducting heater traces (or other electrically conductive traces or elements established at the movable window panel) is maintained whether or not the central sliding or movable window panel is opened or closed or partially opened or partially closed. Thus, a driver of the equipped vehicle can opt to, for example, at least partially open the sliding window for ventilation purposes or the like, and still maintain the benefit of a heatable central sliding window panel for demisting and/or defogging and/or defrosting purposes. This is in stark contrast to conventional known slider window assemblies, epitomized such as by the likes of U.S. Pat. No. 6,014,840, which is hereby incorporated herein by reference in its entirety, where electrical connection to the central sliding window panel (and hence heating/demisting thereof) is lost immediately when the sliding window is moved from its fully closed position.

Changes and modifications to the specifically described embodiments may be carried out without departing from the principles of the present invention, which is intended to be limited only by the scope of the appended claims, as interpreted according to the principles of patent law.

The invention claimed is:

1. A rear slider window assembly for a vehicle, said rear slider window assembly comprising:
    a frame portion having an upper rail and a lower rail;
    at least one fixed window panel that is fixed relative to said frame portion;
    a movable window panel that is movable along said upper and lower rails, wherein said movable window panel is movable between a closed position and an opened position;
    wherein a first electrical element is established at a surface of said movable window;
    wherein said first electrical element is in electrical connection with a power source of the vehicle and remains in electrical connection with the power source of the vehicle irrespective of whether said movable window panel is in said opened position or said closed position;
    wherein said first electrical element is in electrical connection with the power source of the vehicle via a flexible cable and wherein one end of said flexible cable is secured to and electrically connected to a first electrical connector at said first electrical element at said movable window panel and wherein another end of said flexible cable is secured to and electrically connected to a second electrical connector at said fixed window panel; and
    wherein said flexible cable comprises an extendable and retractable flexible cable that extends and retracts responsive to movement of said movable window panel relative to said fixed window panel, and wherein said extendable and retractable flexible cable comprises a coiled flexible cable.

2. The rear slider window assembly of claim 1, wherein a second electrical element is established at a surface of said at least one fixed window panel, and wherein said second electrical connector is disposed at said second electrical element at said at least one fixed window panel.

3. The rear slider window assembly of claim 2, wherein said first and second electrical elements comprise first and second heater grids established on said movable window panel and said at least one fixed window panel, respectively.

4. The rear slider window assembly of claim 1, wherein said flexible cable is substantially coiled around a spool of a spooling mechanism when said movable window panel is in said opened position and wherein said flexible cable is at least partially uncoiled from said spool of said spooling mechanism when said movable window panel is in said closed position.

5. The rear slider window assembly of claim 4, wherein said spooling mechanism is disposed at said fixed window panel.

6. The rear slider window assembly of claim 1, wherein said at least one fixed window panel comprises opposite fixed window panels with an opening therebetween, and wherein said movable window panel is movable between said closed position and said opened position relative to said opening.

7. The rear slider window assembly of claim 6, wherein an electrical element is established at a surface of each of said fixed window panels.

8. The rear slider window assembly of claim 7, wherein at least one of said electrical elements of said fixed window panels is in electrical connection with the power source of the vehicle.

9. The rear slider window assembly of claim 8, wherein said second electrical connector is disposed at one of said electrical elements of said fixed window panels that is in electrical connection with the power source of the vehicle.

10. The rear slider window assembly of claim 9, further comprising an electrical jumper element that is in electrical connection with said electrical element of one of said fixed window panels and said electrical element of the other of said fixed window panels.

11. The rear slider window assembly of claim 10, wherein said electrical element of one of said fixed window panels is in electrical connection with a positive feed of a vehicle power source and said electrical element of the other of said fixed window panels is in electrical connection with a negative feed of the vehicle power source.

12. The rear slider window assembly of claim 1, wherein said second electrical connector is disposed at a lower region of said fixed window panel and said flexible cable is extendable along the lower region of said fixed window panel.

13. The rear slider window assembly of claim 1, wherein said second electrical connector is disposed at an upper region of said fixed window panel and said flexible cable is extendable along the upper region of said fixed window panel.

14. The rear slider window assembly of claim 1, wherein said flexible cable is substantially coiled around a spool of a spooling mechanism when said movable window panel is in its opened position and wherein said flexible cable is at least partially uncoiled from said spool of said spooling mechanism when said movable window panel is in its closed position, and wherein said spooling mechanism comprises a spool that is rotatable about an axis to coil and uncoil said flexible cable at said spool when said movable window panel is moved between its opened and closed positions.

15. The rear slider window assembly of claim 14, wherein said spooling mechanism comprises a biasing element that biases said spool in a coiling direction of rotation, and wherein said spooling mechanism is biased to coil said flexible cable at said spool as said movable window panel is moved towards said opened position.

16. The rear slider window assembly of claim 15, wherein said spooling mechanism comprises a housing that substantially houses said spool, said housing having an aperture through which said flexible cable passes.

17. The rear slider window assembly of claim 14, wherein said flexible cable comprises a generally planar ribbon cable having a pair of flexible conductive elements disposed along a generally planar elongated ribbon element.

18. The rear slider window assembly of claim 14, wherein said flexible cable is flexible in a flexing direction while being substantially non-flexible in a non-flexing direction, said non-flexing direction being generally transverse to said flexing direction.

19. The rear slider window assembly of claim 18, wherein said flexing direction is generally vertical and said axis of rotation of said spool is generally horizontal when said rear slider window assembly is mounted in the vehicle.

20. The rear slider window assembly of claim 18, wherein said flexing direction is generally horizontal and said axis of rotation of said spool is generally vertical when said rear slider window assembly is mounted in the vehicle.

21. The rear slider window assembly of claim 1, wherein said one end of said flexible cable is secured to and electrically connected to said first electrical connector by soldering and said other end of said flexible cable is secured to and electrically connected to said second electrical connector by soldering.

* * * * *

UNITED STATES PATENT AND TRADEMARK OFFICE
CERTIFICATE OF CORRECTION

| | | |
|---|---|---|
| PATENT NO. | : 8,402,695 B2 | Page 1 of 1 |
| APPLICATION NO. | : 12/850864 | |
| DATED | : March 26, 2013 | |
| INVENTOR(S) | : Dominic C. Smith, Troy F. Tooker and Darin J. Snider | |

It is certified that error appears in the above-identified patent and that said Letters Patent is hereby corrected as shown below:

In the Specification

Column 12:
Line 60, "fit" should be --frit--

Column 23:
Line 35, "mariner" should be --manner--

Signed and Sealed this
Eighteenth Day of February, 2014

Michelle K. Lee
*Deputy Director of the United States Patent and Trademark Office*